US007757253B2

(12) United States Patent
Rappaport et al.

(10) Patent No.: US 7,757,253 B2
(45) Date of Patent: Jul. 13, 2010

(54) SYSTEM AND METHOD FOR CAPTURING VIDEO CLIPS FOR FOCUSED NAVIGATION WITHIN A USER INTERFACE

(76) Inventors: Caryl Rappaport, 6479 137th Ave. NE., #380, Redmond, WA (US) 98052; Robert H. Tankersley, 2405 E. Denny Way, Seattle, WA (US) 98122; James A. Billmaier, 22322 NE. 157th St., Woodinville, WA (US) 98072; John M. Kellum, 303 E. Pike St., #PH5, Seattle, WA (US) 98122; Dewey Reid, 42 Oak Mountain Ct., San Rafael, CA (US) 94903; Philip Rogan, 138 McGee Dr., Bozeman, MT (US) 59715

( * ) Notice: Subject to any disclaimer, the term of this patent is extended or adjusted under 35 U.S.C. 154(b) by 2017 days.

(21) Appl. No.: 10/328,754

(22) Filed: Dec. 23, 2002

(65) Prior Publication Data

US 2003/0221192 A1     Nov. 27, 2003

Related U.S. Application Data

(63) Continuation-in-part of application No. 10/097,174, filed on Mar. 12, 2002.

(51) Int. Cl.
*G06F 3/00*     (2006.01)
(52) U.S. Cl. .............................. 725/41; 725/56; 725/61
(58) Field of Classification Search ........................ None
See application file for complete search history.

(56) References Cited

U.S. PATENT DOCUMENTS

| 5,398,074 A | 3/1995 | Duffield et al. ............. 348/564 |
| 5,524,195 A | 6/1996 | Clanton, III et al. ........ 395/155 |
| 5,583,560 A * | 12/1996 | Florin et al. .................. 725/40 |
| 5,602,596 A | 2/1997 | Claussen et al. ............ 348/564 |
| 5,606,374 A | 2/1997 | Bertram ....................... 348/565 |
| 5,619,249 A | 4/1997 | Billock et al. |
| 5,621,456 A | 4/1997 | Florin et al. .................... 348/7 |

(Continued)

FOREIGN PATENT DOCUMENTS

KR    10-2002-0013868        2/2002

(Continued)

OTHER PUBLICATIONS

U.S. Appl. No. 10/260,738, filed Sep. 30, 2002, Billmaier et al.

(Continued)

*Primary Examiner*—Dominic D Saltarelli
*Assistant Examiner*—Chenea P Smith
(74) *Attorney, Agent, or Firm*—Kory D. Christensen; Stoel Rives LLP

(57) ABSTRACT

A video clip is captured from a television broadcast on each of a plurality of channels. The captured video clips are provided to a display interface, which successively displays the captured video clips within a focus area of a user interface in response to an initiating action by a user. The display interface then discontinues the successive display of video clips to show a particular video clip corresponding to a selected channel in response to a terminating action by the user.

38 Claims, 14 Drawing Sheets

U.S. PATENT DOCUMENTS

| | | | | |
|---|---|---|---|---|
| 5,623,613 | A | 4/1997 | Rowe et al. | 395/353 |
| 5,633,657 | A | 5/1997 | Falcón | |
| 5,663,757 | A | 9/1997 | Morales | 348/13 |
| 5,673,401 | A | 9/1997 | Volk et al. | 395/327 |
| 5,677,708 | A | 10/1997 | Matthews, III et al. | 345/115 |
| 5,682,511 | A | 10/1997 | Sposato et al. | 395/353 |
| 5,781,872 | A | 7/1998 | Konishi et al. | |
| 5,812,124 | A | 9/1998 | Eick et al. | 345/327 |
| 5,838,326 | A | 11/1998 | Card et al. | 345/355 |
| 5,850,218 | A | 12/1998 | LaJoie et al. | 345/327 |
| 5,987,150 | A * | 11/1999 | Coppinger | 382/100 |
| 6,002,394 | A | 12/1999 | Schein et al. | |
| 6,005,601 | A | 12/1999 | Ohkura et al. | 348/7 |
| 6,020,930 | A | 2/2000 | Legrand | 348/569 |
| 6,028,600 | A | 2/2000 | Rosin et al. | 345/327 |
| 6,037,933 | A | 3/2000 | Blonstein et al. | 345/327 |
| 6,046,722 | A | 4/2000 | McKiel, Jr. | 345/145 |
| 6,118,492 | A | 9/2000 | Milnes et al. | |
| 6,151,059 | A | 11/2000 | Schein et al. | 348/13 |
| 6,163,345 | A | 12/2000 | Noguchi et al. | 348/564 |
| 6,175,362 | B1 | 1/2001 | Harms et al. | 345/327 |
| 6,177,931 | B1 | 1/2001 | Alexander et al. | |
| 6,188,406 | B1 | 2/2001 | Fong et al. | 345/348 |
| 6,201,540 | B1 | 3/2001 | Gallup et al. | |
| 6,262,722 | B1 | 7/2001 | Allison et al. | 345/327 |
| 6,266,059 | B1 | 7/2001 | Matthews, III et al. | 345/352 |
| 6,266,098 | B1 | 7/2001 | Cove et al. | 348/563 |
| 6,281,940 | B1 | 8/2001 | Sciammarella | 348/564 |
| 6,295,062 | B1 | 9/2001 | Tada et al. | 345/348 |
| 6,313,851 | B1 | 11/2001 | Matthews, III et al. | 345/718 |
| 6,344,880 | B1 | 2/2002 | Takahashi et al. | 348/563 |
| 6,408,437 | B1 | 6/2002 | Hendricks et al. | 725/132 |
| 6,425,129 | B1 | 7/2002 | Sciammarella et al. | 725/38 |
| 6,445,306 | B1 | 9/2002 | Trovato et al. | |
| 6,453,471 | B1 * | 9/2002 | Klosterman | 725/41 |
| 6,481,011 | B1 | 11/2002 | Lemmons | |
| 6,522,342 | B1 | 2/2003 | Gagnon et al. | |
| 6,535,888 | B1 | 3/2003 | Vijayan et al. | |
| 6,538,672 | B1 | 3/2003 | Dobbelaar | 345/810 |
| 6,564,378 | B1 | 5/2003 | Satterfield et al. | |
| 6,577,350 | B1 | 6/2003 | Proebl et al. | 348/564 |
| 6,613,100 | B2 | 9/2003 | Miller | 715/526 |
| 6,642,939 | B1 | 11/2003 | Vallone et al. | 345/721 |
| 6,678,891 | B1 | 1/2004 | Wilcox et al. | 725/42 |
| 6,690,391 | B1 | 2/2004 | Proehl et al. | 345/720 |
| 6,690,394 | B1 | 2/2004 | Harui | |
| 6,698,021 | B1 | 2/2004 | Amini et al. | |
| 6,725,215 | B2 | 4/2004 | Yamamoto | |
| 6,728,675 | B1 | 4/2004 | Maddalozzo, Jr. et al. | 704/258 |
| 6,756,997 | B1 | 6/2004 | Ward, III et al. | |
| 6,769,128 | B1 | 7/2004 | Knee et al. | |
| 6,789,263 | B1 | 9/2004 | Shimada et al. | |
| 6,833,848 | B1 * | 12/2004 | Wolff et al. | 715/719 |
| 6,934,917 | B2 | 8/2005 | Lin | 715/811 |
| 6,938,208 | B2 | 8/2005 | Reichardt | 715/719 |
| 6,941,325 | B1 | 9/2005 | Benitez et al. | 707/200 |
| 6,965,415 | B2 | 11/2005 | Lundblad et al. | 348/556 |
| 6,976,228 | B2 | 12/2005 | Bernhardson | |
| 6,978,472 | B1 | 12/2005 | Nashida et al. | |
| 7,065,710 | B2 | 6/2006 | Hayashi et al. | |
| 7,139,983 | B2 | 11/2006 | Kelts | |
| 7,260,829 | B1 | 8/2007 | Hendricks et al. | |
| 2001/0013126 | A1 * | 8/2001 | Lemmons et al. | 725/53 |
| 2002/0033848 | A1 | 3/2002 | Sciammarella et al. | 345/838 |
| 2002/0038456 | A1 * | 3/2002 | Hansen et al. | 725/46 |
| 2002/0044226 | A1 | 4/2002 | Risi | |
| 2002/0049972 | A1 | 4/2002 | Kimoto | |
| 2002/0054068 | A1 | 5/2002 | Ellis et al. | |
| 2002/0054074 | A1 * | 5/2002 | Sugano et al. | 345/730 |
| 2002/0056129 | A1 | 5/2002 | Blackketter et al. | 725/112 |
| 2002/0070958 | A1 * | 6/2002 | Yeo et al. | 345/723 |
| 2002/0078440 | A1 | 6/2002 | Feinberg et al. | 725/9 |
| 2002/0152474 | A1 | 10/2002 | Dudkiewicz | 725/136 |
| 2002/0174444 | A1 | 11/2002 | Gatto et al. | |
| 2003/0001898 | A1 | 1/2003 | Bernhardson | 345/786 |
| 2003/0001907 | A1 | 1/2003 | Bergsten et al. | |
| 2003/0052900 | A1 | 3/2003 | Card et al. | 345/660 |
| 2003/0063798 | A1 * | 4/2003 | Li et al. | 382/165 |
| 2003/0084452 | A1 | 5/2003 | Ryan et al. | |
| 2003/0090524 | A1 | 5/2003 | Segerberg et al. | 345/786 |
| 2003/0093792 | A1 | 5/2003 | Labeeb et al. | 725/46 |
| 2003/0117440 | A1 | 6/2003 | Hellyar et al. | |
| 2003/0169302 | A1 | 9/2003 | Davidsson et al. | 345/810 |
| 2005/0172319 | A1 | 8/2005 | Reichardt et al. | |

FOREIGN PATENT DOCUMENTS

| | | |
|---|---|---|
| WO | 0033566 A1 | 6/2000 |
| WO | WO 00/33566 | 6/2000 |
| WO | WO 00/65429 | 11/2000 |

OTHER PUBLICATIONS

U.S. Appl. No. 10/097,174, filed Mar. 12, 2002, Billmaier et al.
U.S. Appl. No. 10/105,088, filed Mar. 22, 2002, Billmaier.
U.S. Appl. No. 10/105,083, filed Mar. 22, 2002, Billmaier.
U.S. Appl. No. 10/097,195, filed Mar. 12, 2002, Billmaier et al.
U.S. Appl. No. 10/108,178, filed Mar. 27, 2002, Billmaier et al.
U.S. Appl. No. 10/113,889, filed Mar. 29, 2002, Billmaier et al.
U.S. Appl. No. 10/107,601, filed Mar. 27, 2002, Billmaier et al.
U.S. Appl. No. 10/113,820, filed Mar. 29, 2002, Billmaier et al.
U.S. Appl. No. 10/186,209, filed Jun. 27, 2002, Istvan et al.
U.S. Appl. No. 10/186,210, filed Jun. 27, 2002, Billmaier et al.
U.S. Appl. No. 10/230,964, filed Aug. 29, 2002, Istvan et al.
U.S. Appl. No. 10/260,700, filed Sep. 30, 2002, Billmaier et al.
U.S. Appl. No. 10/270,738, filed Sep. 30, 2002, Billmaier et al.
U.S. Appl. No. 10/260,208, filed Sep. 30, 2002, Billmaier et al.
U.S. Appl. No. 10/259,199, filed Sep. 27, 2002, Young et al.
U.S. Appl. No. 10/138,810, filed May 3, 2002, Billmaier et al.
U.S. Appl. No. 10/138,805, filed May 3, 2002, Billmaier et al.
U.S. Appl. No. 10/138,803, filed May 3, 2020, Billmaier et al.
U.S. Appl. No. 10/183,804, filed May 3, 2002, Billmaier et al.
U.S. Appl. No. 60/317,612, filed Sep. 6, 2001, Reid et al.
U.S. Appl. No. 60/324,997, filed Sep. 26, 2001, Reid et al.
U.S. Appl. No. 10/186,094, filed Jun. 29, 2002, Billmaier et al.
U.S. Appl. No. 10/187,118, filed Jun. 29, 2002, Billmaier et al.
U.S. Appl. No. 10/186,095, filed Jun. 29, 2002, Billmaier et al.
U.S. Appl. No. 60/377,627, filed May 3, 2002, Billmaier et al.
U.S. Appl. No. 29/161,708, filed Jun. 3, 2002, Nguyen et al.
U.S. Appl. No. 10/251,366, filed Sep. 20, 2002, Allen et al.
U.S. Appl. No. 10/260,881, filed Sep. 30, 2002, Allen et al.
U.S. Appl. No. 10/320,900, filed Dec. 16, 2002, Kolde et al.
U.S. Appl. No. 10/328,514, filed Dec. 23, 2002, Kolde et al.
Office Action mailed Oct. 19, 2006, for U.S. Appl. No. 10/097,174, filed Mar. 12, 2002.
Office Action mailed May 4, 2007, for U.S. Appl. No. 10/097,174, filed Mar. 12, 2002.
Office Action mailed Jan. 11, 2007, for U.S. Appl. No. 10/105,088, filed Mar. 22, 2002.
Office Action mailed Jul. 6, 2007, for U.S. Appl. No. 10/105,088, filed Mar. 22, 2002.
Office Action mailed Jun. 13, 2007, for U.S. Appl. No. 10/108,178, filed Mar. 27, 2002.
Office Action mailed Jan. 3, 2007, for U.S. Appl. No. 10/113,889, filed Mar. 29, 2002.
Office Action mailed Jun. 15, 2007, for U.S. Appl. No. 10/113,889, filed Mar. 29, 2002.
Office Action mailed Nov. 29, 2006, for U.S. Appl. No. 10/107,601, filed Mar. 27,.2002.
Office Action mailed Jun. 20, 2007, for U.S. Appl. No. 10/107,601, filed Mar. 27, 2002.
Office Action mailed May 24, 2007, for U.S. Appl. No. 10/186,209, filed Jun. 27, 2002.
Office Action mailed Jul. 5, 2007, for U.S. Appl. No. 10/186,210, filed Jun. 27, 2002.

Office Action mailed Dec. 13, 2007, for U.S. Appl. No. 10/186,209, filed Jun. 27, 2002.
Office Action mailed Dec. 13, 2007, for U.S. Appl. No. 10/186,210, filed Jun. 27, 2002.
Office Action mailed Dec. 13, 2007, for U.S. Appl. No. 10/113,889, filed Mar. 29, 2002.
Office Action mailed Dec. 26, 2007, for U.S. Appl. No. 10/105,088, filed Mar. 22, 2002.
Office Action mailed Jan. 24, 2008, for U.S. Appl. No. 10/108,178, filed Mar. 27, 2002.
Office Action mailed Jan. 22, 2008, for U.S. Appl. No. 10/260,738, filed Sep. 30, 2002.
Office action mailed Jan. 22, 2009, for U.S. Appl. No. 10/108,178, filed Mar. 27, 2002.
Office action mailed Feb. 5, 2009, for U.S. Appl. No. 10/186,209, filed Jun. 27, 2002.
Office action mailed Feb. 18, 2009, for U.S. Appl. No. 10/186,210, filed Jun. 27, 2002.
Office action mailed Jan. 6, 2009, for U.S. Appl. No. 11/519,521, filed Sep. 12, 2006.
Office Action mailed Jul. 29, 2008 in U.S. Appl. No. 10/097,174, filed Mar. 12, 2002.
Office Action mailed Jul. 3, 2008 in U.S. Appl. No. 10/105,088, filed Mar. 22, 2002.
Office Action mailed Jan. 22, 2009 in U.S. Appl. No. 10/108,178, filed Mar. 27, 2002.
Notice of Allowance mailed Oct. 29, 2008 in U.S. Appl. No. 10/113,889, filed Mar. 29, 2002.
Office Action mailed Jul. 31, 2008 in U.S. Appl. No. 10/108,178, filed Mar. 27, 2002.
Office Action mailed Apr. 27, 2009 in U.S. Appl. No. 10/186,209, filed Jun. 27, 2002.
Office Action mailed Feb. 18, 2009 in U.S. Appl. No. 10/186,210, filed Jun. 27, 2002.
Office Action mailed Aug. 4, 2008 in U.S. Appl. No. 10/186,210, filed Jun. 27, 2002.
Supplemental Notice of Allowability in U.S. Appl. No. 10/260,700, filed Sep. 30, 2002.
Office Action mailed Apr. 27, 2009 in U.S. Appl. No. 10/260,740, filed Sep. 30, 2002.
Office Action mailed Sep. 11, 2008 in U.S. Appl. No. 10/260,738, filed Sep. 30, 2002.
Office Action mailed Apr. 14, 2009 in U.S. Appl. No. 11/426,183, filed Jun. 23, 2006.

* cited by examiner

SYSTEM AND METHOD FOR CAPTURING VIDEO CLIPS FOR FOCUSED NAVIGATION WITHIN A USER INTERFACE

RELATED APPLICATIONS

This application is a continuation-in-part of U.S. patent application Ser. No. 10/097,174, filed Mar. 12, 2002, for "System and Method for Focused Navigation within an Interactive Television User Interface", with inventors James A. Billmaier, John M. Kellum, Dewey Reid, and Philip Rogan, which application is incorporated herein by reference in its entirety.

BACKGROUND

1. Field of the Invention

The present invention relates generally to the field of graphical user interfaces. More specifically, the present invention relates to a system and method for capturing video clips for focused navigation within a graphical user interface.

2. Description of Related Background Art

Recent advances in technology have vastly increased the number of available options within personal computers (PCs), interactive television (ITV) systems, mobile computing devices, as the like. For instance, current ITV systems offer hundreds of broadcast channels and a variety of interactive options, including e-mail, videoconferencing, instant messaging, online banking, online purchasing, and so forth.

Unfortunately, despite technological advances, user interfaces for these systems have remained largely unchanged, making navigation through all of the newly available options no easy task. For example, a user of a modern ITV system must scan through potentially hundreds of channels and other options, often by repeatedly pressing a button on a remote control. Such an outdated approach is far too slow and inconvenient to facilitate effective operation of a modern ITV system.

Similar problems exist with PC interfaces. The graphical user interface (GUI) of a modern PC looks remarkably similar to the first GUI developed twenty years ago. Small icons representing user options are arranged in rows and columns on a graphical representation of a desktop. Many of the icons are identical, requiring the addition of text labels as a distinguishing feature. Typically, a user must individually examine each icon and read each label—a time-consuming process that does not lend itself to effective navigation of the numerous options available in a modern PC.

BRIEF DESCRIPTION OF THE DRAWINGS

Non-exhaustive embodiments of the invention are described with reference to the figures, in which.

DETAILED DESCRIPTION

Figure 1:
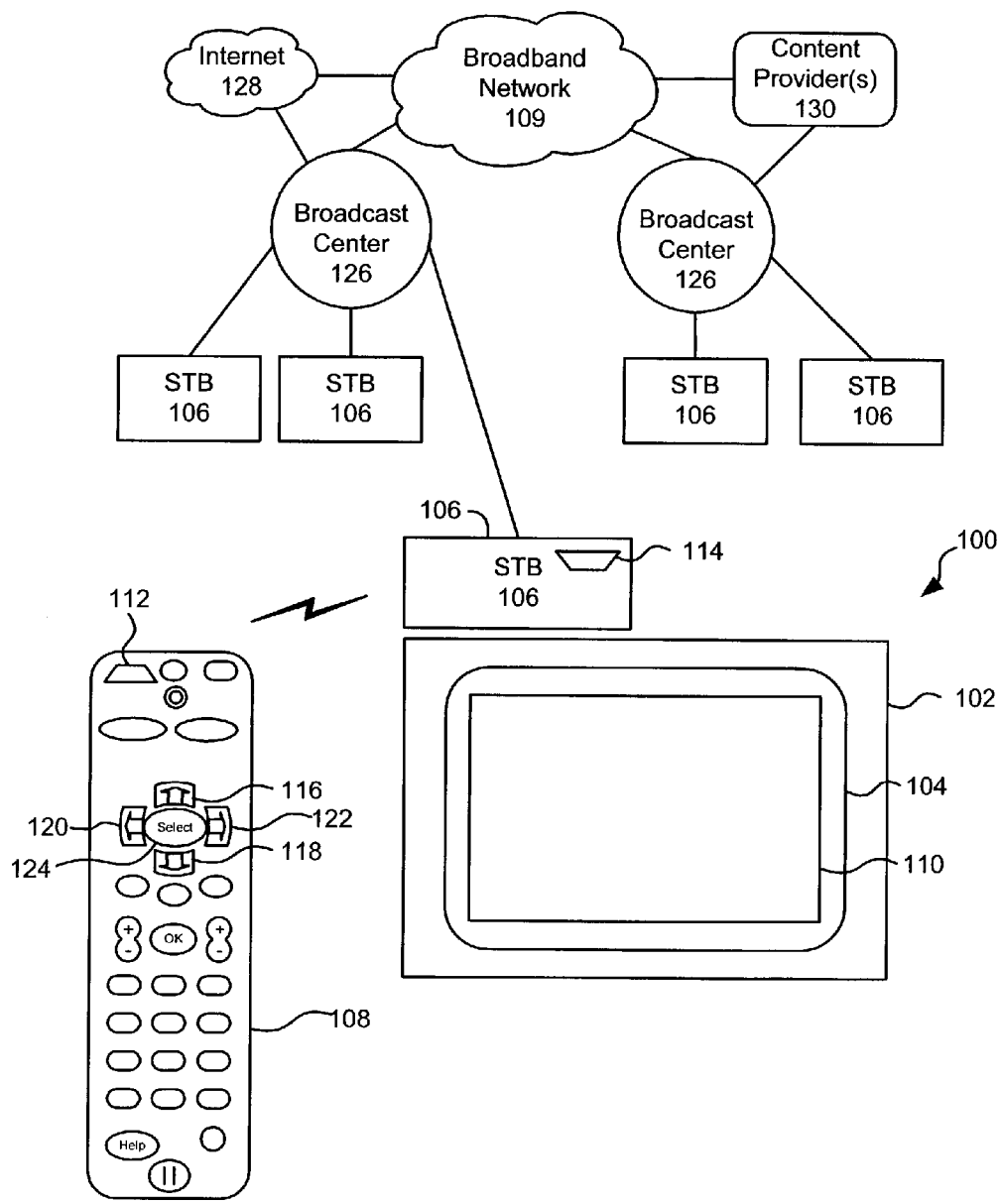
FIG. 1 is a block diagram of an ITV system.

Reference is now made to the figures in which like reference numerals refer to like or similar elements. The first digit (or digits) of the reference numerals indicates the figure in which the corresponding element is introduced.

Throughout the specification, reference to "one embodiment" or "an embodiment" means that a particular described feature, structure, or characteristic is included in at least one embodiment of the present invention. Thus, appearances of the phrases "in one embodiment" or "in an embodiment" in various places throughout this specification are not necessarily all referring to the same embodiment.

Furthermore, the described features, structures, or characteristics may be combined in any suitable manner in one or more embodiments. In the following description, numerous specific details, such as examples of programming, software modules, user selections, network transactions, database queries, database structures, etc., are provided for a thorough understanding of the embodiments of the invention. Those skilled in the art will recognize, however, that the invention can be practiced without one or more of the specific details, or with other methods, components, materials, etc. In other instances, well-known structures, materials, or operations are not shown or not described in detail to avoid obscuring aspects of the invention.

While the following description makes particular reference to ITV systems, it should be recognized that the present invention may be used in conjunction with any type of information/entertainment system in which selectable options may be displayed on a display screen. Examples of such systems include, but are not limited to, ITV systems, personal computers, and mobile computing devices, such as PDAs, webpads, cellular telephones, and the like.

Referring now to FIG. 1, a block diagram of an ITV system 100 is shown according to an embodiment of the invention. In one configuration, the ITV system 100 includes a television (TV) 102 or other device having a display screen 104, a set-top box (STB) 106, and a remote control 108.

The STB 106 serves as a gateway between the TV 102 and a broadband network 109, such as a cable television network or a direct broadcast satellite (DBS) network. One commercially-available example of an STB 106 is the Motorola DCT5000® interactive set-top terminal.

The STB 106 receives encoded television signals and other data from the broadband network 109 and processes the same for display on the display screen 104. The STB 106 may also include hardware and software for presenting a graphical user interface (GUI) 110 on the display screen 104.

In alternative embodiments, the STB 106 may be integrated into the TV 102, a mobile computing device, or the like. In still other embodiments, the term "STB" may broadly encompass a personal computer (PC) that performs STB functions. In such an embodiment, a PC may be used to process TV signals and other data received from the broadband network 109. The PC may operate in the context of a home network to provide display signals to a variety of devices, including one or more television sets, computer monitors, personal digital assistants (PDAs), cellular phones, and the like. A variety of home networking systems and protocols may be used, such as Ethernet, 802.11b, Bluetooth, Home PNA, HomePlug, etc.

The remote control 108 is provided for convenient remote operation of the STB 106 and the TV 102. The remote control 108 may include a wireless transmitter 112 for transmitting control signals to a wireless receiver 114 within the STB 106 using radio frequency (RF) or infrared (IR) technologies. The remote control 108 may further include a number of buttons or other similar controls, such as an "Up" button 116, a "Down" button 118, a "Left" button 120, a "Right" button 122, and a "Select" button 124. Of course, a variety of other buttons or controls may be provided within the scope of the invention. In alternative implementations, the remote control 108 may be embodied as a keyboard, mouse, webpad, PDA, or other suitable input device.

As depicted in FIG. 1, a number of STBs 106 may be interconnected via a broadcast center 126 and the broadband network 109. In the context of a cable television network, a broadcast center 126 is called a "head-end", which is a centrally-located facility within a community where television programming is received from a local cable TV satellite downlink or other source and packaged together for transmission to customer homes.

A broadcast center 126 may also be embodied as a satellite broadcast center within a direct broadcast satellite (DBS) system. A DBS system may utilize a small 18-inch satellite dish, which is an antenna for receiving a satellite broadcast signal. Each STB 106 may be integrated with or coupled to a digital integrated receiver/decoder (IRD), which separates each channel, and decompresses and translates the digital signal from the satellite dish for displayed by the television 102.

Programming for a DBS system may be distributed, for example, by multiple high-power satellites in geosynchronous orbit, each with multiple transponders. Compression (e.g., MPEG) may be used to increase the amount of programming that can be transmitted in the available bandwidth.

The broadcast centers 126 may be used to gather programming content, ensure its digital quality, and uplink the signal to the satellites. Programming may be received by the broadcast centers 126 from one or more content providers 130 or networks (e.g., CNN®, ESPN®, HBO®, TBS®, etc.) via satellite, fiber optic cable and/or special digital tape. Satellite-delivered programming is typically immediately digitized, encrypted and uplinked to the orbiting satellites. The satellites retransmit the signal to every earth-station, e.g., every compatible DBS system receiver dish at customers' homes and businesses.

Regardless of the nature of the network 109, the broadcast centers 126 may be coupled directly to one another or through the network 109. In alternative embodiments, broadcast centers 126 may be connected via a separate network, one particular example of which is the Internet 128 (which the network 109 may form a part). The Internet 128 is a "network of networks" and is well known to those skilled in the art. Communication over the Internet 128 is accomplished using standard protocols, such as TCP/IP (Transmission Control Protocol/Internet Protocol) and the like.

As previously noted, an ITV system 100 typically provides access to a plurality of selectable options, such as channels, programs, applications, digital media files, etc. For instance, an ITV system 100 may provide access to literally hundreds of broadcast TV channels, pay-per-view (PPV) channels, music channels, and the like. Additionally, an ITV system 100 may provide access to a number of interactive channels or applications, including web browsers, e-mail programs, chat clients (instant messaging), personal video recorder (PVR) applications, contact directories, and the like. Furthermore, an ITV system 100 may store or provide access to stored media programs, such as PVR recordings, digital photographs, audio (MP3) files, and the like.

Figure 2:
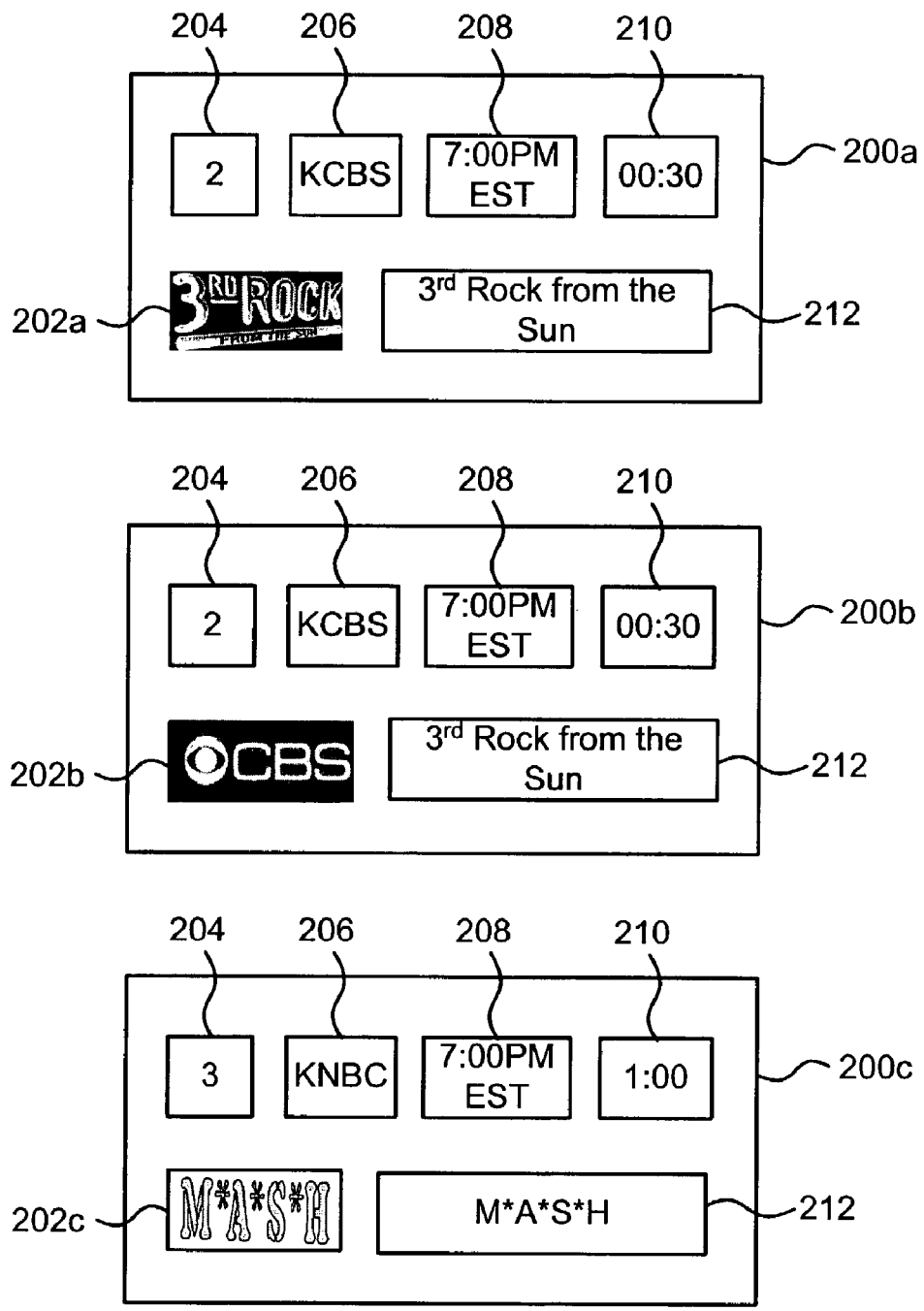
FIG. 2. is an illustration of a plurality of cards for use in focused navigation.

As shown in FIG. 2, each selectable option within the ITV system 100 may be associated with a card 200. A card 200 is an object or other suitable data structure that provides information about and/or access to an available option within an ITV system 100. A card 200 may be embodied as a container of all of the attributes, actions, and/or states needed to facilitate interaction with the option represented thereby. Cards 200 may be stored in any suitable format within a memory or disk drive of the ITV system 100.

Each card 200 may include a graphical representation 202 for display in the GUI 110, as described in greater detail below. The graphical representation 202 may include various types or combinations of artwork, digital photography, captured video clips or frames, animations, or the like.

As depicted in FIG. 2, cards 200a-c may represent television programs or channels. The television programs may be ongoing (live), upcoming, or previously-recorded. In addition to a graphical representation 202, such cards 200 may include, for instance, a channel number 204, a channel name or identifier 206, a starting time 208, a running time 210, an ending time (not shown), and a text description 212. Of course, cards 200 representing other types of options may include additional or different types of information, such as audio clips, file or path names, network addresses (URLs), etc.

Cards 200 may be generated locally within an ITV system 100 or may be received via the broadband network 109 using well known protocols or techniques, e.g., HTTP (hypertext transfer protocol), FTP (file transfer protocol), ATVEF (advanced television enhancement forum) triggers, etc. In one embodiment, a card 200 may be received with data encoded in the vertical blanking interval (VBI) of a television signal. Additionally, information associated with cards 200 (e.g., channel number 204, starting time 208, running time 210) may be dynamically updated with information received in ATVEF triggers or other embedded data streams within a video signal.

Figure 3:
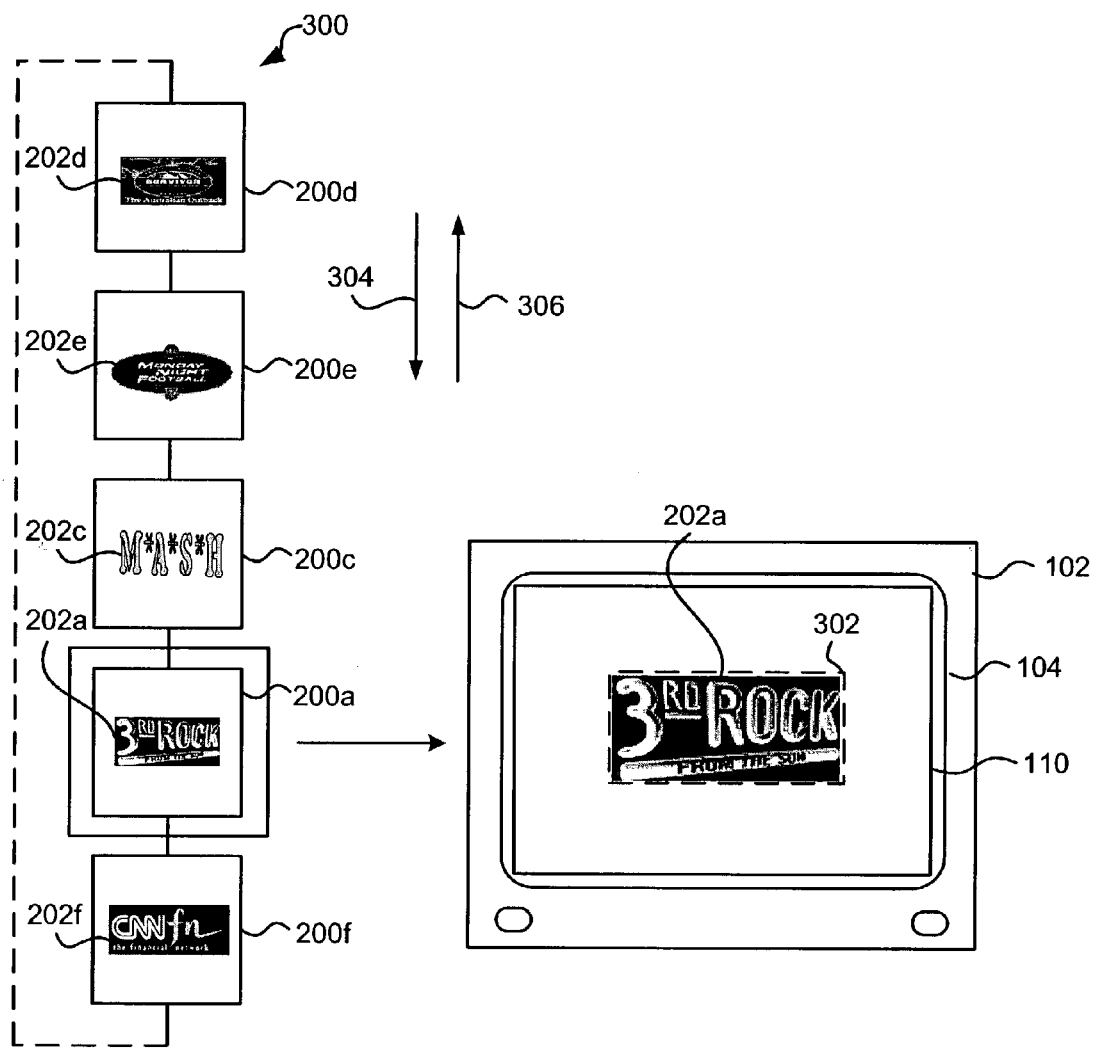
FIG. 3 is a block diagram of a sequence of cards to be successively displayed within a focus area of a GUI.

Referring to FIG. 3, a plurality of cards 200 may be linked or grouped together in a sequence 300. The sequence 300 may be circular (as depicted), linear, or configured in other ways. The sequence 300 may be linked in numerical order by channel number 204, in alphabetical order by the text description 212, or in other preset or user-defined ways. For instance, the sequence 300 may be determined based on one or a combination of other inputs, such as user profile information, user preferences, external events or data feeds (e.g., telephone rings, PVR notifications, alerts for external programming sources), and/or filters (e.g., sports, movies).

In the illustrated embodiment, one card 200a in the sequence 300 is typically "active" or in "focus". As shown, the active card 200a may be displayed within a focus area 302 of a GUI 110 displayed on the TV 102. For brevity, the phrase "displaying a card" refers herein to displaying a graphical representation 202 associated with the card 200. Other information associated with the card, e.g., the channel number 204 or text description 212, may or may not be displayed as desired.

A focus area 302 is a single location of the GUI 110 at which the cards 200 are successively displayed (displayed one at a time in sequence). The focus area 302 may be located at a central or visually dominant location of the GUI 110, although the invention is not limited in this respect. As used herein, the term "focused navigation" refers to a technique of displaying a sequence 300 of cards 200 within a focus area 302.

In response to a single initiating action by a user, the cards 200 in a sequence 300 are successively displayed within the focus area 302. Where the sequence 300 is circular, the successive display of cards 200 may continue indefinitely until halted by the user by a subsequent action, as described more fully below.

The action to initiate navigation may be pressing (or pressing and holding down) a button on the remote control 108. For example, the user may press the "Up" button 116 to initiate the successive display in a first direction within the sequence 300 (indicated by line 304), and press the "Down" button 118 to initiate navigation in the opposite direction (indicated by line 306). Alternatively, the user may speak a command into a microphone (either within the STB 106 or remote control 108) to initiate navigation. Of course, the user may initiate navigation in a variety of other ways within the scope of the invention.

In one embodiment, the sequence 300 of cards 200 is successively displayed at a rate selected by the user. For instance, initially pressing the "Up" button 116 may cause the sequence 300 to be displayed at a rate of two cards 200 per second. As the user continues to hold the "Up" button 116, the rate may increase gradually or in steps to any practical rate within the limit of a typical user's ability to recognize individual cards 200 when they are displayed. Many users are able to recognize individual cards 200 at a rate of seven or more cards 200 per second (420 per minute), facilitating rapid navigation of available options.

The cards 200, when displayed within the focus area 302, may be sufficiently large to permit user recognition from a comfortable viewing distance for the particular display screen 104. Thus, unlike PC icons, which typically occupy as little as 1/200 of the display area of the display screen 104, the displayed cards 200 (and the card 200 in the focus area 302 in particular) may occupy between 1/10 and 1/4 of the total display area.

When the user sees a card 200 being displayed of a channel or option that she desires to select or view, the user may take some additional, terminating action and the successive display of cards 200 is halted. For example, where navigation was initiated by pressing and holding down the "Up" button 116, the user may release the "Up" button 116 to discontinue navigation. In an alternative embodiment, where the successive display was initiated simply by pressing a button, the user may press the same or a different button to halt the successive display. Of course, the user may discontinue navigation in a variety of other ways within the scope of the invention.

If the user's reaction time is fast enough, the card 200 representing the desired channel remains displayed in the focus area 302 once navigation is discontinued. However, the user's reaction time may not be fast enough and one or more cards 200 may be subsequently displayed. In such a case, the user may manually backtrack to the desired card 200 by repeatedly activating a suitable control on the remote control 108. For example, briefly pressing the "Up" or "Down" buttons 116, 118 may result in the previous or next card 200, respectively, being displayed. Alternatively, as described in greater detail below, the ITV system 100 may attempt to determine the delay between the user recognizing the desired card 200 and taking the subsequent action and compensate for that delay by reverting to a previously-displayed card 200.

The user may select the channel or option associated with the displayed card 200 by taking a selection action. For instance, the user may press the "Select" button 124 on the remote control 108. Alternatively, the selection action may simply be waiting a set amount of time without activating any controls on the remote control 108.

The effect of activating the card 200 will vary dramatically depending on the type of card 200. For instance, in the case of a card 200 representing a live television program, the GUI 110 may be replaced by a full-size version of the program. Alternatively, activating a card 200 corresponding to a purchase opportunity may result in the display of a web browser directed to a particular website.

Figure 4:
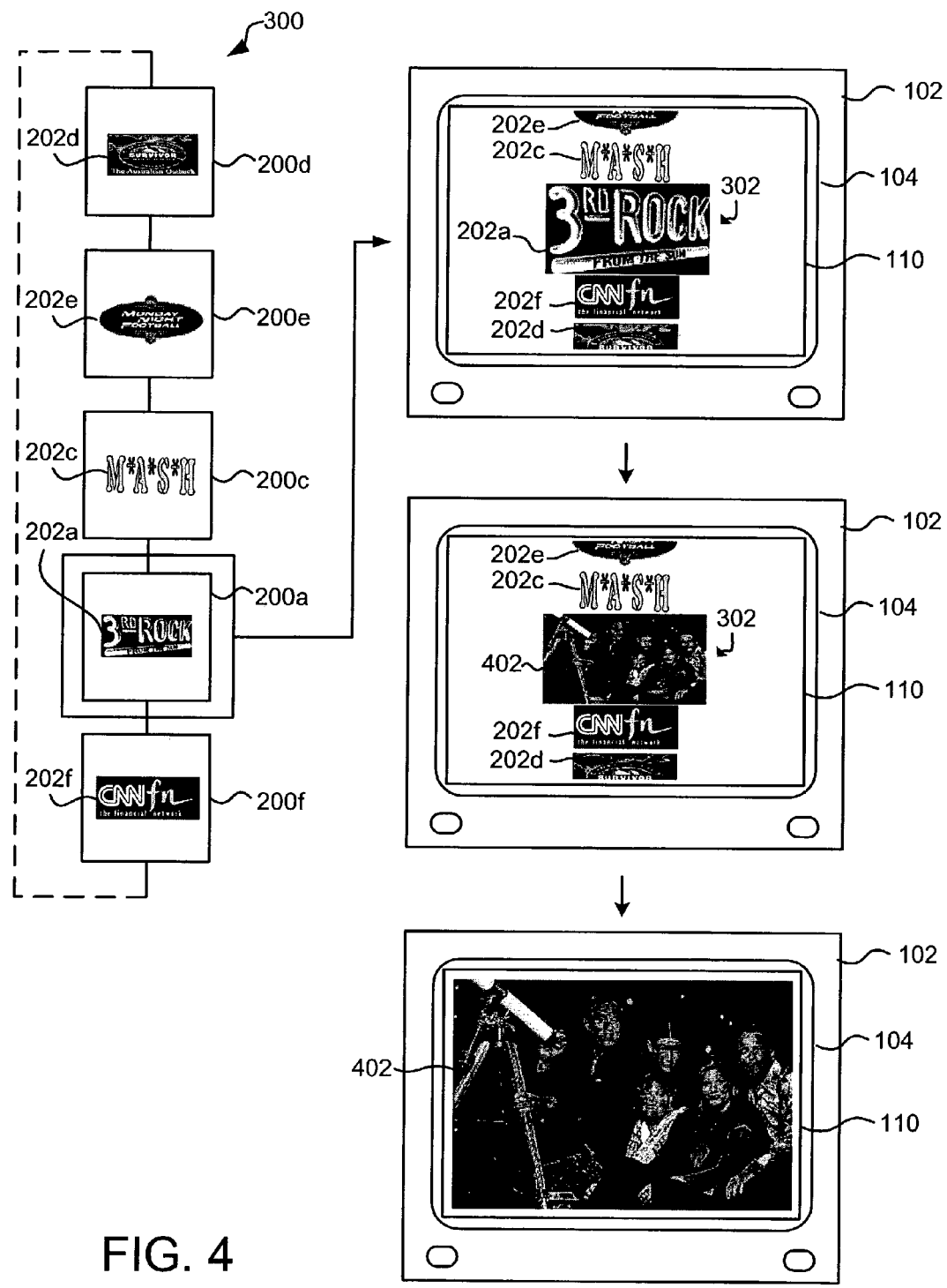
FIG. 4 is a block diagram of a sequence of cards being displayed along an axis of a GUI.

As shown in FIG. 4, one or more previous and next cards 200 within the sequence 300 may be displayed along an axis (not shown) of the GUI 110 to provide the user with a more complete navigational context within the sequence 300. In one embodiment, the axis is an imaginary line that extends across the GUI 110 in a particular direction and intersects the focus area 302. For example, at least a subset of the sequence 300 of cards 200 may be displayed along a vertical axis, with the active card 200a being displayed in the focus area 302. In alternative embodiments, the cards is 200 may be displayed along horizontal or diagonal axes, or in other suitable ways.

Typically, one or more cards 200 in a sequence 300 are not displayed. These off-screen or hidden cards may be dynamically changed, replaced, or updated during navigation, e.g., a card 200 representing an advertisement may change from one sponsor to another.

When a user activates one of the navigation buttons of the remote control 108 (e.g., the "Up" or "Down" buttons 116, 118), the displayed cards 200 in the sequence 300 may be scrolled (e.g., shifted or cycled) downward or upward, respectively, with a new card (e.g., card 200c or 202f) entering the focus area 302. Alternatively, the "Left" or "Right" button 120, 122 may be used for the same purpose.

As depicted, the card 200a in the focus area 302 may be visually emphasized in various ways. For example, the card 200a may be enlarged relative to the other displayed cards 200. Alternatively, the card 200a may be animated, marked, illuminated, highlighted, or otherwise set apart from the other cards 200.

In certain embodiments, if the user allows a card 200 representing a live television program to remain in the focus area 302 for a certain amount of time (e.g., 2 seconds), the card 200a may be overlaid by a video window 402 showing the live television program. Furthermore, if the user continues to linger on the card 200a (or if the user presses the "Select" button 124), the video window 402 may be enlarged 402 to fill the entire display screen 104. Other types of cards 200 may exhibit different types of behaviors when the card 200 remains in the focus area 302 for an established period of time.

Where the cards 200 represent live television programs, a card 200 corresponding to the currently-tuned channel (at the current date and time) may be selected by default for display in the focus area 302 each time the GUI 110 is shown. This may occur, for instance, when the user is watching TV and presses a button (such as the "Select" button 124) in order to display the GUI 110. Additionally, an indication of the currently-displayed card 200 in the focus area 302 may be stored in non-volatile memory or otherwise maintained such that if a reset condition occurs (e.g., the STB 106 is rebooted or reset after a power loss, etc.) the last-displayed card 200 may be restored to the focus area 302.

Figure 5:
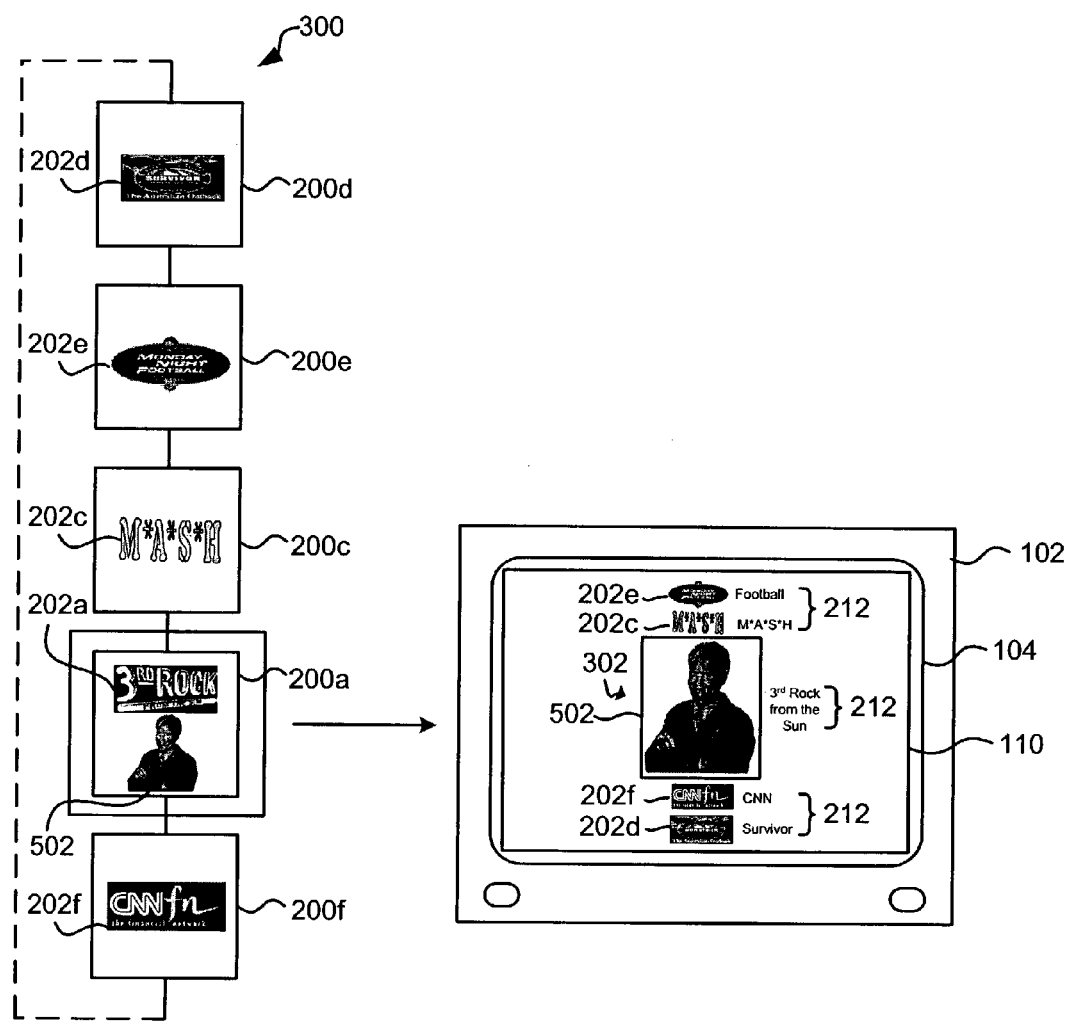
FIG. 5 is a block diagram of a card including an alternative graphical image.

Referring to FIG. 5, cards 200 may include one or more alternative graphical representations 502, which may be displayed when the card 200 enters the focus area 302. As depicted, cards 200c-f displayed outside of the focus area 302 are shown using a first graphical representation 202c-f. However, when the card 200a enters the focus area 302, the alternative graphical representation 502 is shown. Providing an alternative graphical representation 502 allows a designer to provide a more detailed or higher-resolution image for display in the focus area 302, which may be enlarged relative to other graphical representations 202 outside of the focus area 302.

In certain implementations, various types of supplemental information, such as text descriptions 212, may be displayed next to the graphical representations 202, 502 in the GUI 110 to aid the user in identifying and knowing the status of the corresponding options. Sometimes a graphical representation 202 may simply be a picture or logo, which may not be familiar to every user. The addition of a text description 212 is helpful in such cases.

The text description 212 may be displayed above, below, or to the side of the graphical representation 202, 502. Moreover, the text may be of a suitably large size to be easily discernable by the user from a normal viewing distance. During navigation, the text descriptions 212 are shifted or cycled with the corresponding graphical representations 202, 502.

In the depicted embodiment, the text descriptions 212 identify a television programs or series, and are shown to the right of the corresponding graphical representations 202. Of course, many other types of text descriptions 212 may be provided, and different placements or orientations of the text descriptions 212 are contemplated.

Figure 6:
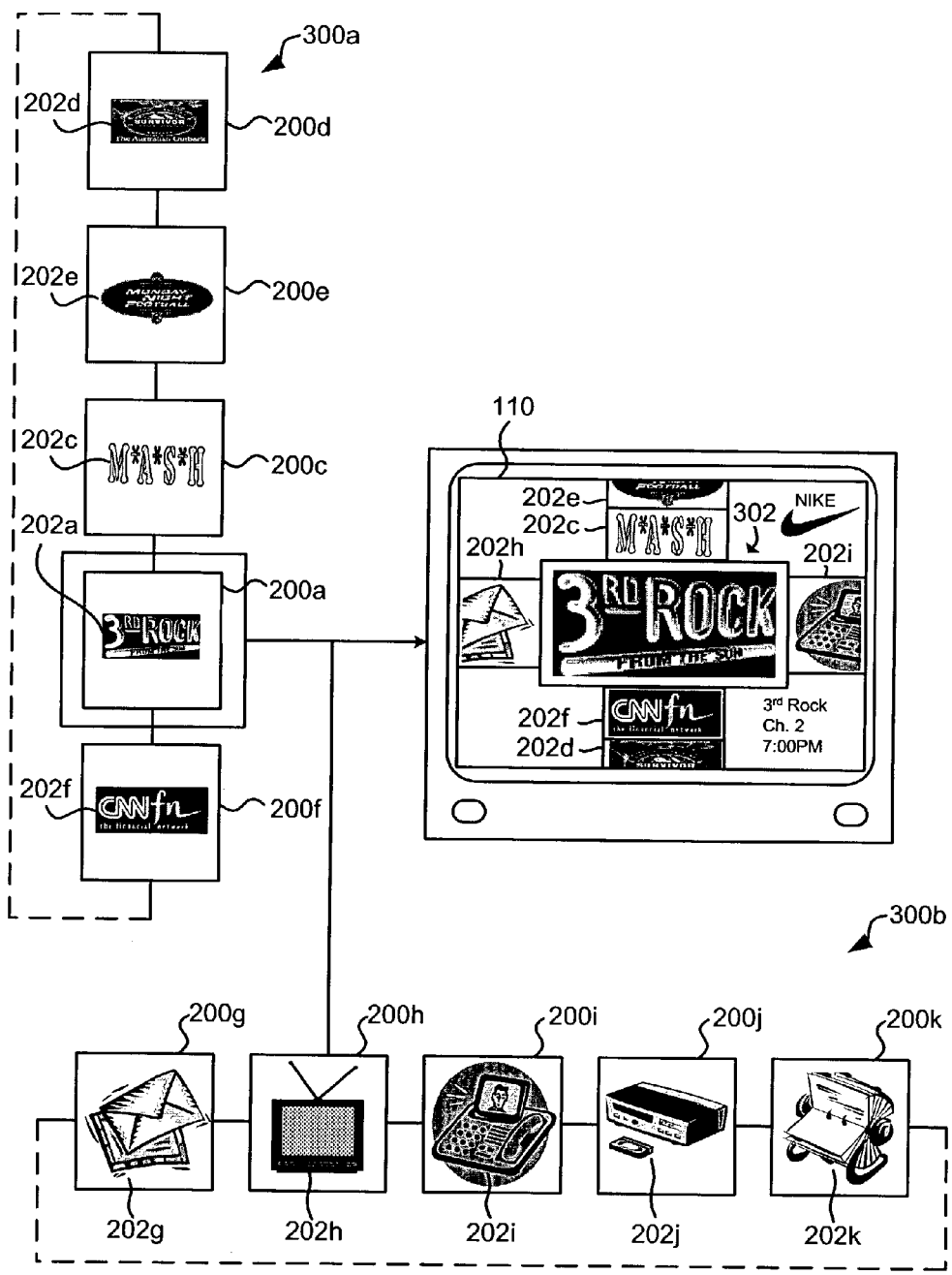
FIG. 6 is a block diagram of a card including supplemental information.

Referring to FIG. 6, multiple sequences 300a-b including different types of cards 200 may be displayed simultaneously. For instance, one or more cards 200 from a sequence 300a representing television programs may be displayed as described in reference to FIG. 4. In addition, one or more cards 200 from a sequence 300b representing interactive channels, applications, or digital media, may also be displayed.

As illustrated, the second sequence 300b may be displayed horizontally, perpendicular to the first sequence 300a, such that the sequences 300a-b intersect at (and define) the focus area 302. Any number of sequences 300 may be displayed on the GUI 110 simultaneously. Of course, the selection of vertical and horizontal for the sequences 300a-b is merely exemplary and not required.

In the depicted embodiment, the "Up" and "Down" buttons 116, 118 may be used to shift or cycle the vertically-displayed sequence 300a within the GUI 110 in order to is bring one of the corresponding cards 200a-e into the focus area 302. Likewise, the "Left" and "Right" buttons 120, 122 may be used to shift or cycle the horizontally-displayed sequence 300b to bring one of the corresponding cards 200g-k into the focus area 302.

In one implementation, bringing a card 200 from one sequence 300 into the focus area 302 will determine or change which other sequence 300 is displayed. For example, bringing the card 200h (TV shape) from the horizontal sequence 300b into focus may result in the vertical sequence 300a (television programs) being displayed. Alternatively, bringing the card 200g (envelope shape) into focus may result in a vertical sequence 300 (not shown) corresponding to e-mail messages or contacts. Likewise, bringing the card 200i (videophone shape) into focus may result in a vertical sequence 300 of a videoconferencing buddy list, while the card 200j (VCR shape) may display a vertical sequence 300 of television programs recorded by a PVR. In alternative embodiments, a selection from a vertical sequence 300 may affect which horizontal sequence 300 is displayed.

Figure 7:
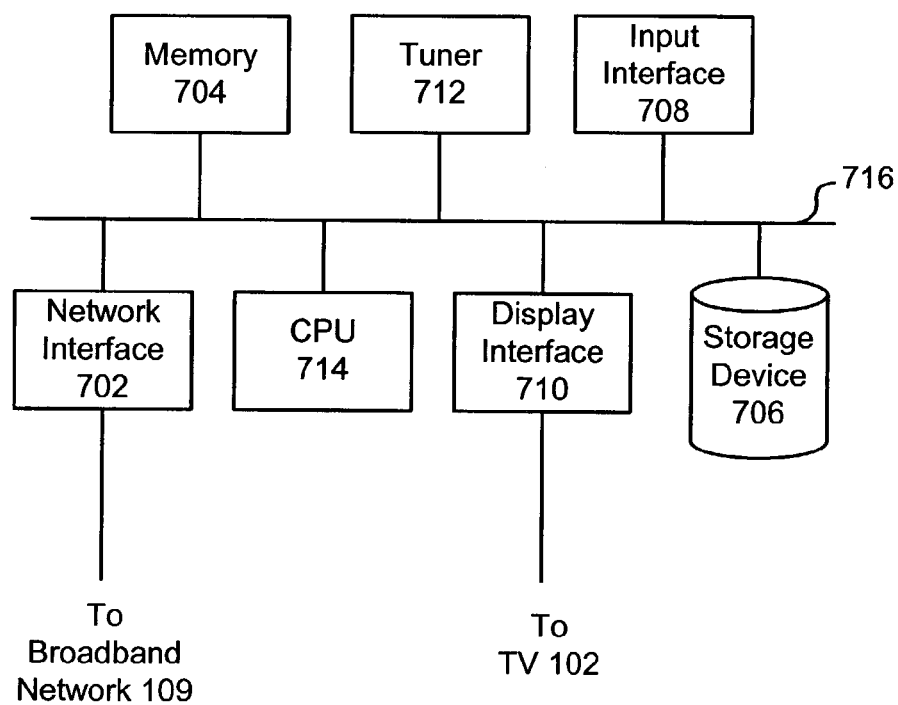
FIG. 7 is a block diagram of a set-top box (STB)

FIG. 7 is a block diagram of an STB 106 according to an embodiment of the invention. The illustrated components may be logical or physical and may be implemented using any suitable combination of hardware, software, and/or firmware.

In one configuration, the STB 106 includes a network interface 702 for communicating with the broadband network 109. The network interface 1402 may conform to the DOCSIS (Data Over Cable Service Interface Specification) or DAVIC (Digital Audio-Visual Council) cable modem standards. Additionally, the network interface 702 may include standard circuitry for receiving MPEG streams including multiplexed television programs and data from the broadband network 109. One or more sequences 300 of cards 200 may be received by the interface 702 from a server accessible via the broadband network 109 or the Internet 128 via HTTP, ATVEF triggers, or other mechanisms.

The STB 106 further includes a memory 704, such as a random access memory (RAM) and/or read-only memory (ROM). The memory 704 may store an operating system (OS) for the STB 106 (e.g., Windows CE® or Linux®), application program code, and various types of data. In one embodiment, the memory 704 stores one or more sequences 300 of cards 200 may be stored within a storage device 706, such as a hard disk drive, optical storage device, or the like.

An input interface 708 may be provided for receiving commands from an input device, such as a remote control 108. In one embodiment, the input interface 708 may include or be associated with the wireless receiver 114 described in connection with FIG. 1. The input interface 708 may detect a single user action for initiating navigation, such as the user pressing the "Up" or "Down" buttons 116, 118 on the remote control 108.

The STB 106 may further include a display interface 710 for generating a GUI 110 on an attached TV 102 or other display device. In addition, the display interface 710 may be responsible for successively displaying cards 200 from one or more stored sequences 300 in a focus area 302 of the GUI 110 in response to the single user action being detected by the input interface 708. Likewise, the display interface 710 may be responsible for halting the successive display in response to detection of a subsequent user action.

A tuner 712 may be included for demodulating and demultiplexing selected MPEG streams received by the STB 106 from the broadband network 109. The tuner 712 may be used to tune to a particular television program in response to a user selection of a card 200, e.g., in response to the user pressing the "Select" button 124 or when the user "lingers" on a card 200 in the focus area 302.

A CPU 714 controls the operation of the STB 106, including the other components described above, which may be in electrical communication with the CPU 714 via a bus 716. The CPU 714 may be embodied as a microprocessor, a microcontroller, a digital signal processor (DSP) or other device known in the art. For instance, the CPU 714 may be embodied as an Intel® x86 processor. The CPU 714 may perform logical and arithmetic operations based on program code stored within the memory 704 or the storage device 706.

Of course, FIG. 7 illustrates only one possible configuration of an STB 106. Those skilled in the art will recognize that various other architectures and components may be provided within the scope of the invention. In addition, various standard components are not illustrated in order to avoid obscuring aspects of the invention.

Figure 8:
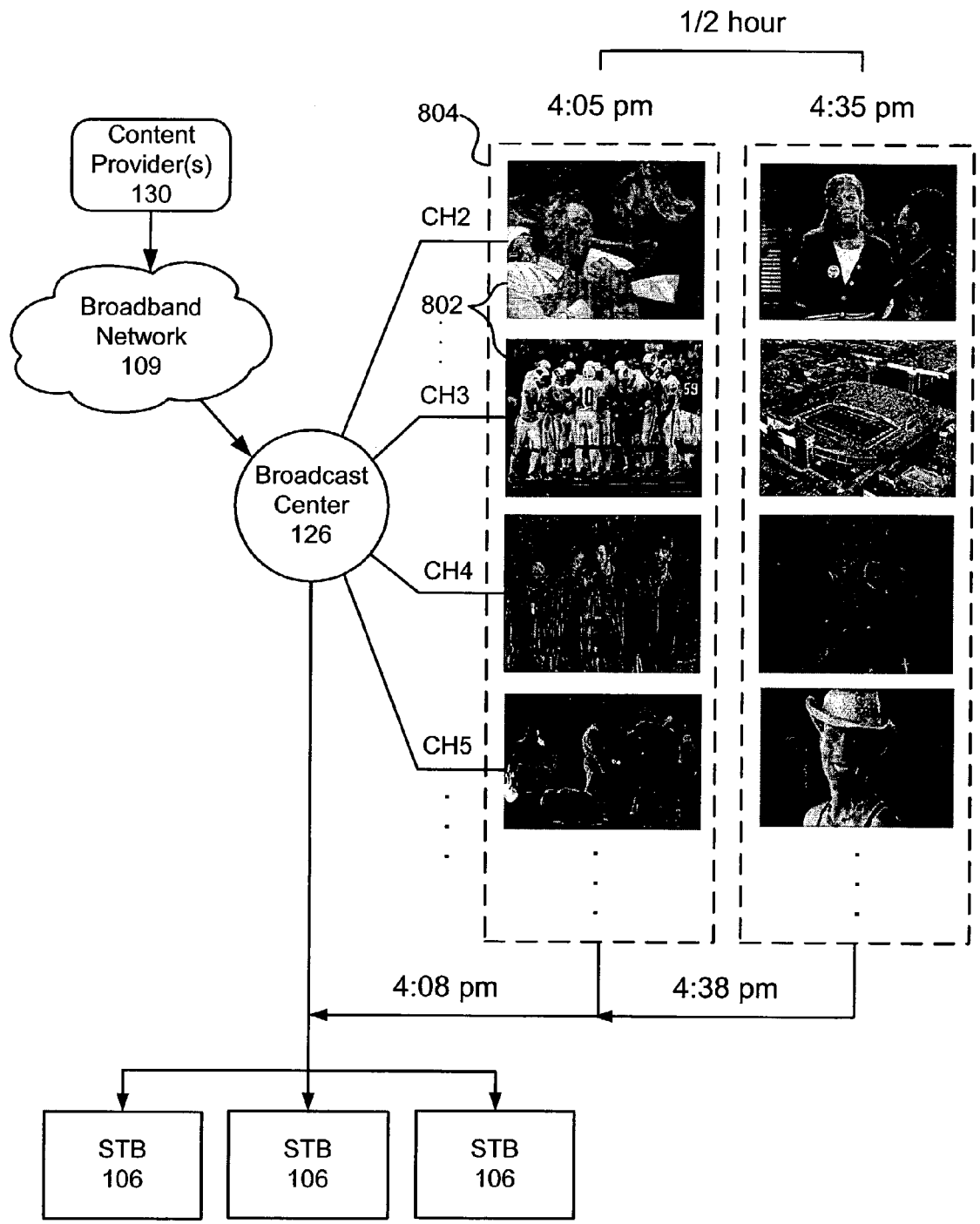
FIG. 8 is an illustration of a technique for capturing video clips from a television broadcast at periodic intervals.

In one embodiment, as depicted in FIG. 8, video clips 802 captured from a television broadcast may be used as graphical representations 202 for some or all of the channels in focused navigation. In alternative embodiments, an individual video frame (e.g., an I-frame from an MPEG stream) may be captured instead of a video clip 802.

A video clip 802 may be of any suitable length (e.g., 5-20 seconds) based on storage and bandwidth considerations. In certain configurations, a video clip 802 has a lower resolution or bit rate than the original broadcast from which it was captured. Sound is not required in a video clip 802, but may be included in various embodiments.

Video clips 802 may be prepared well in advance by content producers from available source material (e.g., promotional tapes or the like). In such an embodiment, the video clips 802 may or may not be episode-specific. In other words, a single video clip 802 may be created and used for multiple episodes of a particular TV program. The video clips 802 may be sent to the STBs 106 at night when more bandwidth is typically available.

Alternatively, the video clips 802 may be captured at regular intervals, e.g., every hour or every thirty minutes, for each available channel (or certain designated channels). For instance, as shown in FIG. 8, capture may commence at five minutes past the half hour in order to avoid commercials and/or opening credits.

In the depicted embodiment, the video clips 802 may be centrally captured at a broadcast center 126, which receives television broadcasts from one or more content providers 130 for distribution to a plurality of STBs 106. A broadcast center 126 may include multiple tuners, which may operate in parallel to successively tune to each available channel to capture a video clip 802 being broadcast on each channel.

The captured video clips 802 may then be packaged by the broadcast center 126 into update packages 804, which are data structures adapted for periodic transmission to the STBs 106 associated with the broadcast center 126. The update packages 804 may be embodied in any suitable format, such as XML documents or the like. The video clips 802 within the packages 804 may be tagged or associated with an indication is of the channel from which the clips 802 were captured. Alternatively, the packages 804 may be organized (e.g., sequentially) by channel number such that the original channel may be later identified. In still other embodiments, an update package 804 may comprise an archive file including multiple compressed video clip files (e.g., a ZIP file with multiple AVI or MPG files).

In various embodiments, video clips 802 and/or update packages 804 are compressed to reduce transmission bandwidth. Various compression techniques may be used, such as MPEG, 7-Zip, or any other suitable compression method. Thereafter, the update packages 804 may be transmitted to the STBs 106 at regular intervals, e.g., at eight minutes past the half-hour.

Figure 9:
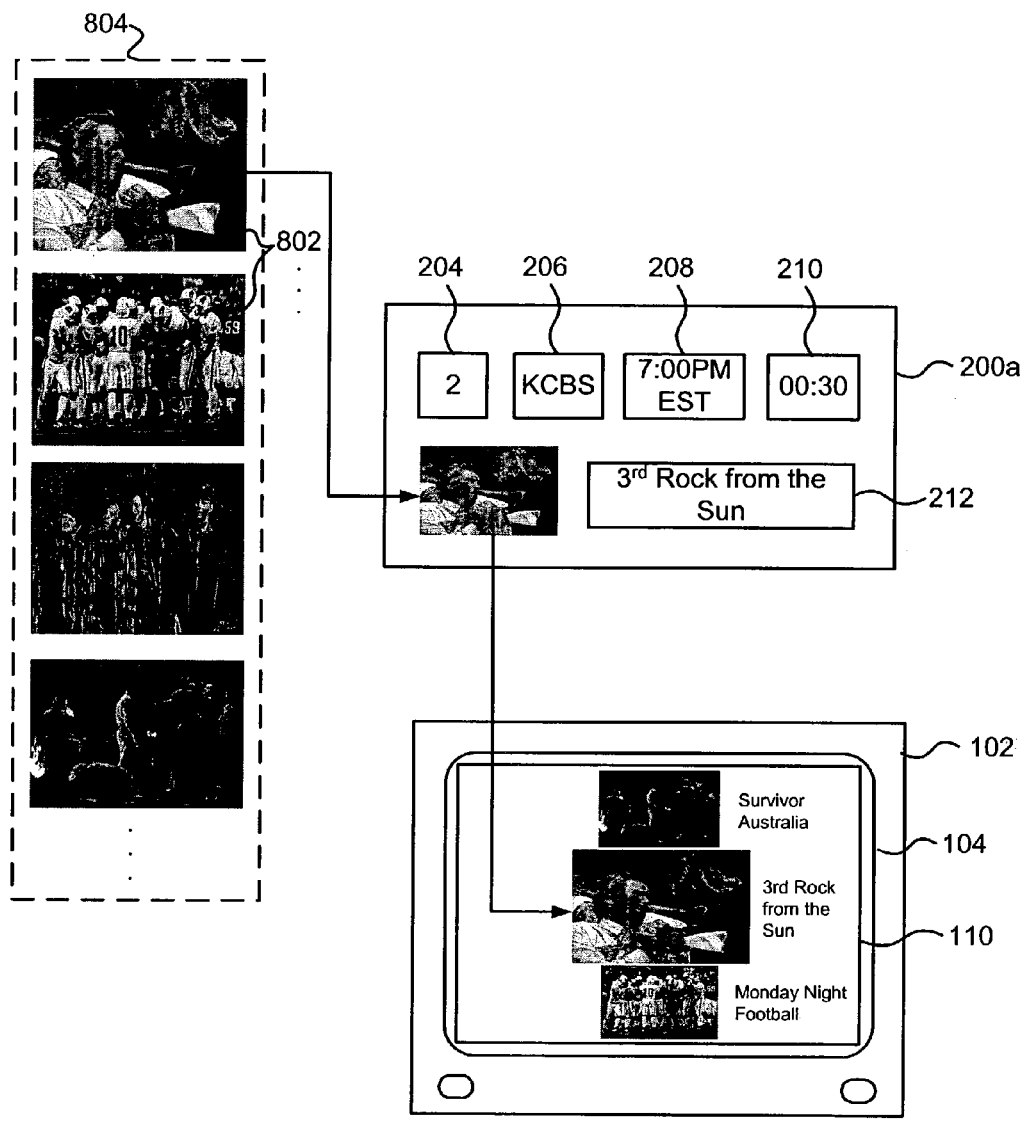
FIG. 9 is an illustration of a technique for associating captured video clips with cards for use in focused navigation.

When an update package 804 is received, as shown in FIG. 9, the video clips 802 may be unpackaged (parsed) and then associated with the corresponding cards 200. This may be accomplished by means of channel tags associated with the video clips 802, by means of the organization of the package 804, or in other ways. In one embodiment, a video clip 802 may be stored within or linked to the corresponding card object.

Thereafter, the cards 200 containing video clips 802 may be used in the context of focused navigation, as previously described. However, rather than being presented with generic, pre-prepared artwork, a user may be presented with actual scenes from the particular television program being broadcast, which may assist a user in determining whether to tune to a channel. Of course, in certain configurations, a user may be presented with both pre-prepared artwork and video clips 802 during focused navigation.

Figure 10:
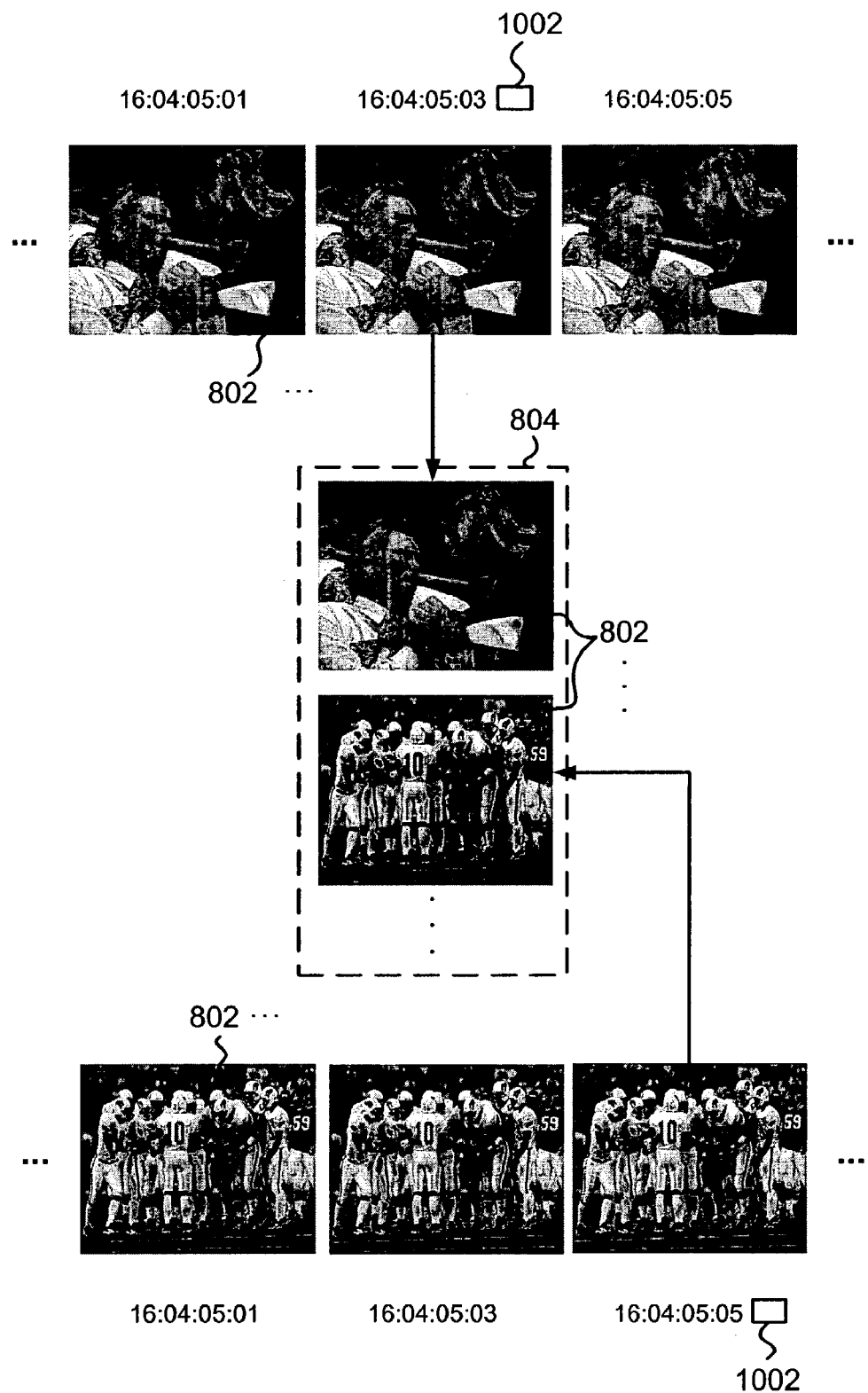
FIG. 10 is an illustration of a technique for capturing video clips from a television broadcast based on embedded tags.

In an alternative embodiment, as depicted in FIG. 10, video clips 802 may not be captured at periodic intervals. Rather, tags 1002 may be inserted into the television broadcast to indicate when a video clip 802 should be captured for a particular channel, i.e. the clip 802 is captured when the tag 1002 is detected. The tags 1002 may be implemented as special MPEG packets, ATVEF triggers, or the like.

One difficulty with capturing video clips 802 based on time intervals is that the captured clip 802 may not be particularly relevant to, or descriptive of, the program being currently broadcast. For instance, the clip 802 may entirely consist of a shot of a blank wall, which would not assist the user in determining whether to view the channel. Inserting tags 1002 into the broadcast gives content producers 130 the ability to select highly relevant clips (or at least avoid misdescriptive or irrelevant ones) for use in focused navigation.

In a related embodiment, a content provider 130 may provide a schedule (not shown) of times at which the video clips 802 should be captured for each channel. This embodiment produces essentially the same results as the tag-based embodiment, but does so with a single schedule update rather than a series of tags 1002.

In any of the above-described embodiments, the capturing of a video clip 802 may be attempted, albeit inadvertently, during a commercial break. In general, capturing a video clip 802 of an advertisement would be of little value toga user in determining whether to view a particular channel.

Figure 11:
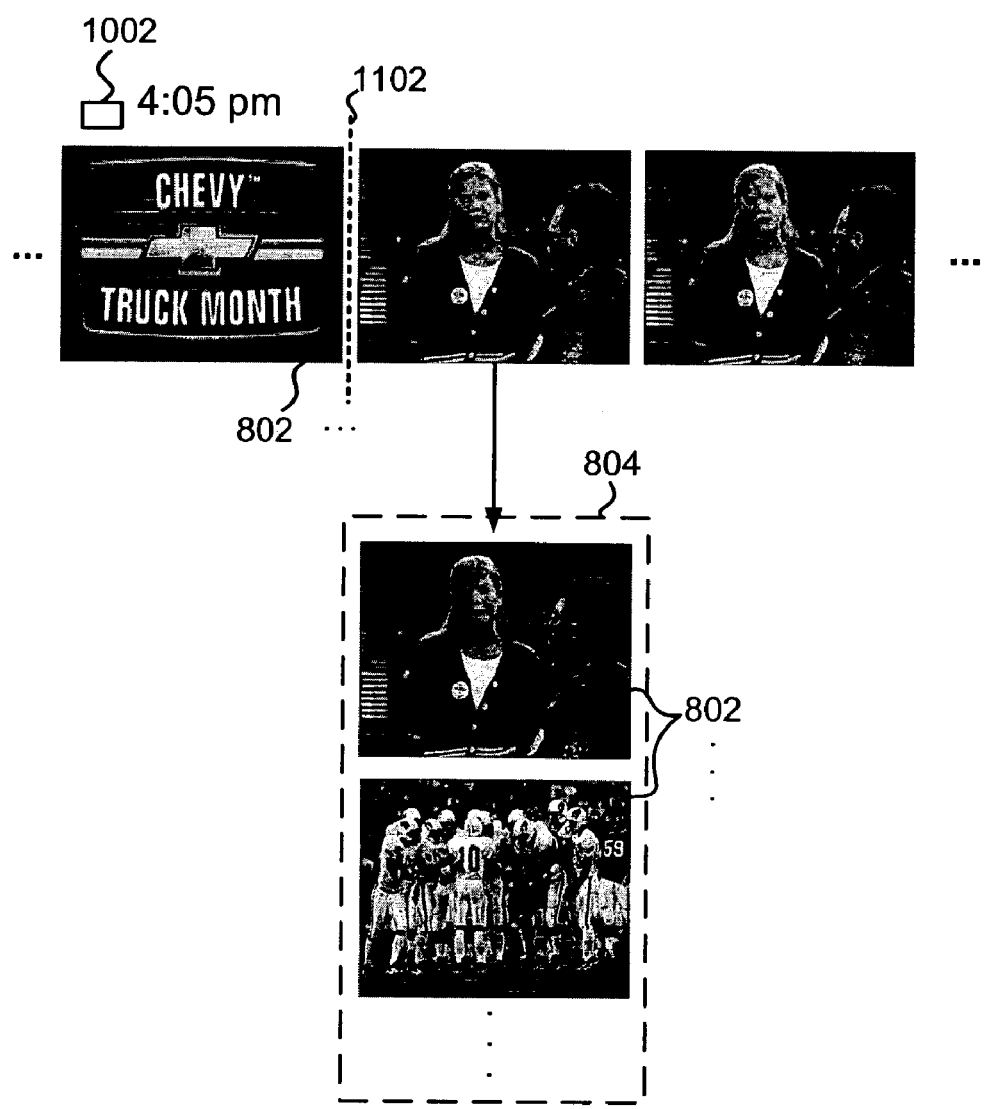
FIG. 11 is an illustration of a technique for delaying the capture of a video clip until after a commercial break.

In one implementation, as shown in FIG. 11, commercial breaks are detected in order to not capture video clips 802 comprising advertisements. This may be accomplished using various known indicators of commercials, e.g., lapses in closed captioning greater than a particular threshold, occurrences of black clips, high rates of scene changes and motion, discrete messages or triggers identifying a commercial, etc.

For instance, in the depicted embodiment, a clip 802 during a commercial break would have been captured due to a tag 1002 or, alternatively, the time of day. In such a situation, a clip 802 is not captured until a point after the end of the commercial break, indicated by dashed line 1102.

Figure 12:
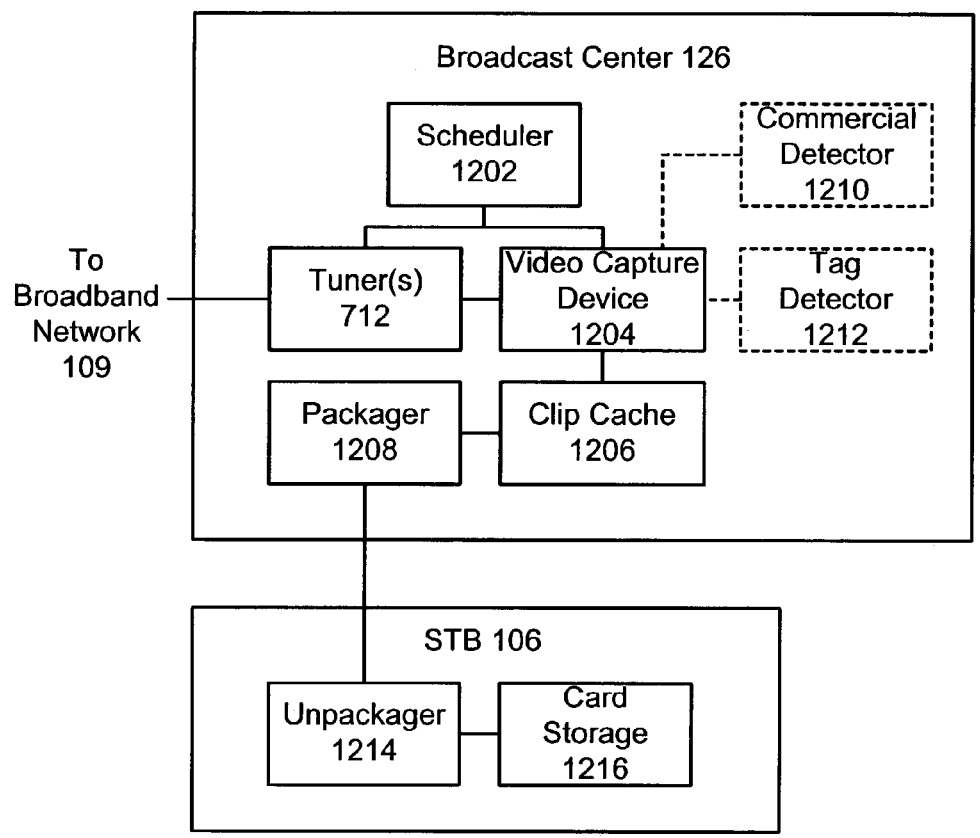
FIG. 12 is a block diagram of a system for capturing video clips within a broadcast center.

Referring now to FIG. 12, there is shown a block diagram of a system 1200 within a broadcast center 126 for capturing video clips 802 for use in focused navigation. The illustrated components may be implemented using any suitable combination of hardware, software, or firmware, as will be known to those of skill in the art. The broadcast center 126 may include a server having a hardware configuration similar to the one shown in FIG. 7, but with faster processors, more memory, etc., than an STB 106.

In one embodiment, a scheduler 1202 determines when to initiate the capture of one or more video clips 802. As previously indicated, this may be done at regular intervals or be based on a schedule provided by a content provider 130. The scheduler 1202 includes or has access to a clock (not shown) for accurately determining the current time of day.

When the time to capture the video clips 802 has arrived, the scheduler 1202 signals a tuner 712 within the broadcast center 126 to tune to the first available channel (or a channel for which a tag 1002 was detected). In certain embodiments, the broadcast center 126 may include a plurality of tuners 712, which may operate in parallel to successively tune to each available channel.

Once the tuner 712 has been tuned to the desired channel, the scheduler 1202 and/or tuner 712 signals a video capture device 1204 to capture the clip 802 being currently broadcast on the channel. The video capture device 1204 may include an MPEG decoder for capturing clips 802 from MPEG-encoded broadcast. Alternatively, the video capture device 1204 may include standard video capturing hardware for capturing a clip 802 from an analog broadcast. Numerous analog video capture devices are available from Hauppauge™, ATI™, Dazzle™, Pinnacle™, and other manufacturers.

The captured clip 802 may be temporarily stored in a clip cache 1206 until all of the clips 802 corresponding to the available channels (or tagged channels) have been captured. Thereafter, a packager 1208 may package the captured clips 802 within an update package 804, as described with reference to FIG. 8. The packaging process may include compressing the clips 802, associating the stored clips 802 with indicia of the corresponding channels, etc. As used herein, the packager 1208 and/or clip cache 1206 may be referred to as a "transmission component," since these components are used to transmit clips 802 from the broadcast center 126 to one or more STBs 106 or internally between components of an STB 106.

In certain configurations, the broadcast center 126 may further include a commercial detector 1210 for detecting commercial breaks within a broadcast. When a commercial break is detected, the commercial detector 1210 produces a signal that inhibits the capture of clips 802 by the video capture device 1204.

The broadcast center 126 may also include a tag detector 1212 for implementing the embodiment described with reference to FIG. 10. In one embodiment, the tag detector 1212 detects the presence of an embedded tag 1002 within the broadcast and generates a signal that causes the video capture device 1204 to immediately begin capturing a video clip 802.

At periodic intervals, the update package 804 is transmitted to one or more STBs 106 associated with the broadcast center 126. The broadcast medium may be wired or wireless depending on the type of network, e.g. cable or satellite. Various standard protocols may be used for the transmission as known to those of skill in the art.

An unpackager 1214 within an STB 106 may unpackage or parse the clips 802 stored within the update package 804. The unpackager 1214 may further associate the resulting clips 802 with corresponding cards 1212 within a card storage 1216, such as a RAM memory or hard disk drive, as described in connection with FIG. 9.

Figure 13:
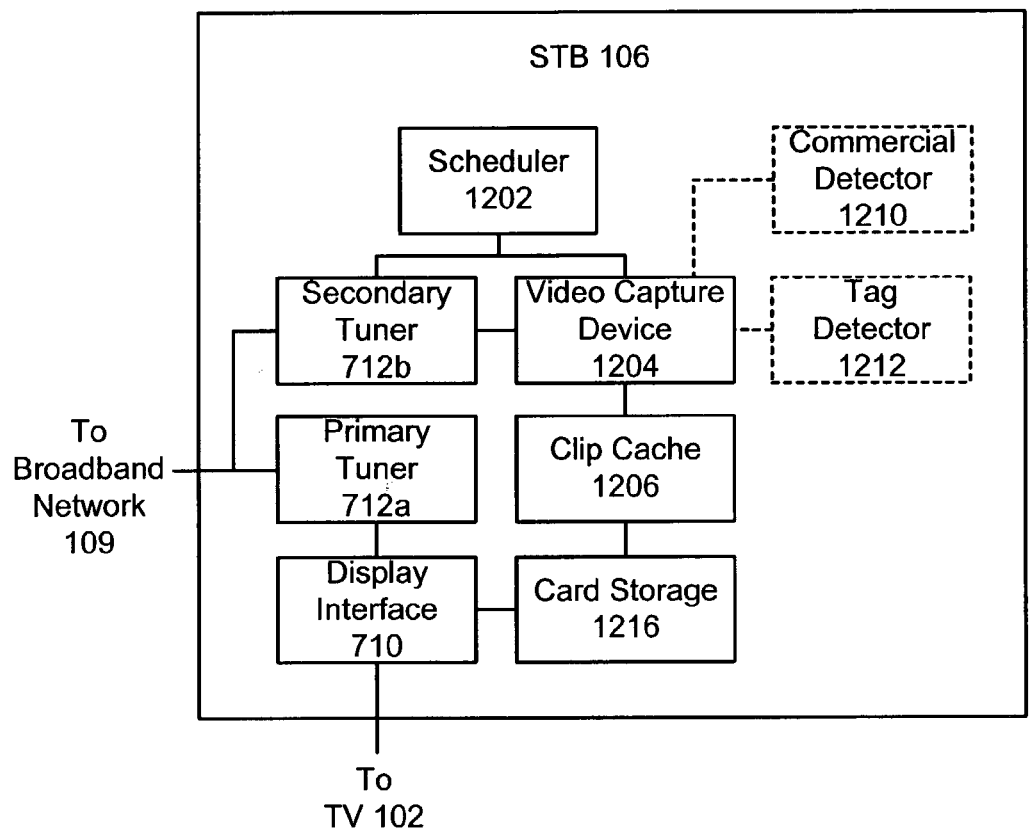
FIG. 13 is a block diagram of a system for capturing video clips within an STB.

FIG. 13 is a block diagram of an alternative embodiment of the invention in which video clips 802 are captured locally within an STB 106 rather than a broadcast center 126. In such an embodiment, at least two tuners 712 are desirable in order that the capturing of video clips 802 does not interfere with television viewing.

As shown in FIG. 13, a primary tuner 712a interacts with the display interface 710 to allow the user to tune to and view a desired channel. The secondary tuner 712b, on the other hand, may be used to successively tune to each available channel and capture video clips 802 for use in focused navigation. As such, the output of the secondary tuner 712b need not be provided to the display interface 710, but rather, to the video capture device 1204.

Increasingly, STBs 106 employ secondary tuners 712b for personal video recording (PVR) applications. As a result, the capture of video clips 802 may be interrupted, in one embodiment, while the secondary tuner 712b is being used to digitally record a television program. In alternative embodiments, however, the secondary tuner 712b may be reserved for PVR applications, while a third tuner (not shown) is provided for multiple functions, including capturing video clips 802, assisting the secondary tuner 712b in PVR applications, and/or providing output for an additional television 102 within a home.

The other components of the system 1200 represented within FIG. 13, e.g., the scheduler 1202, video capture device 1204, clip cache 1206, commercial detector 1210, tag detector 1212, etc., operate substantially as described in connection with FIG. 12., except that the components are located within an entertainment system (e.g., STB 106) rather than the broadcast center 126.

Figure 14:
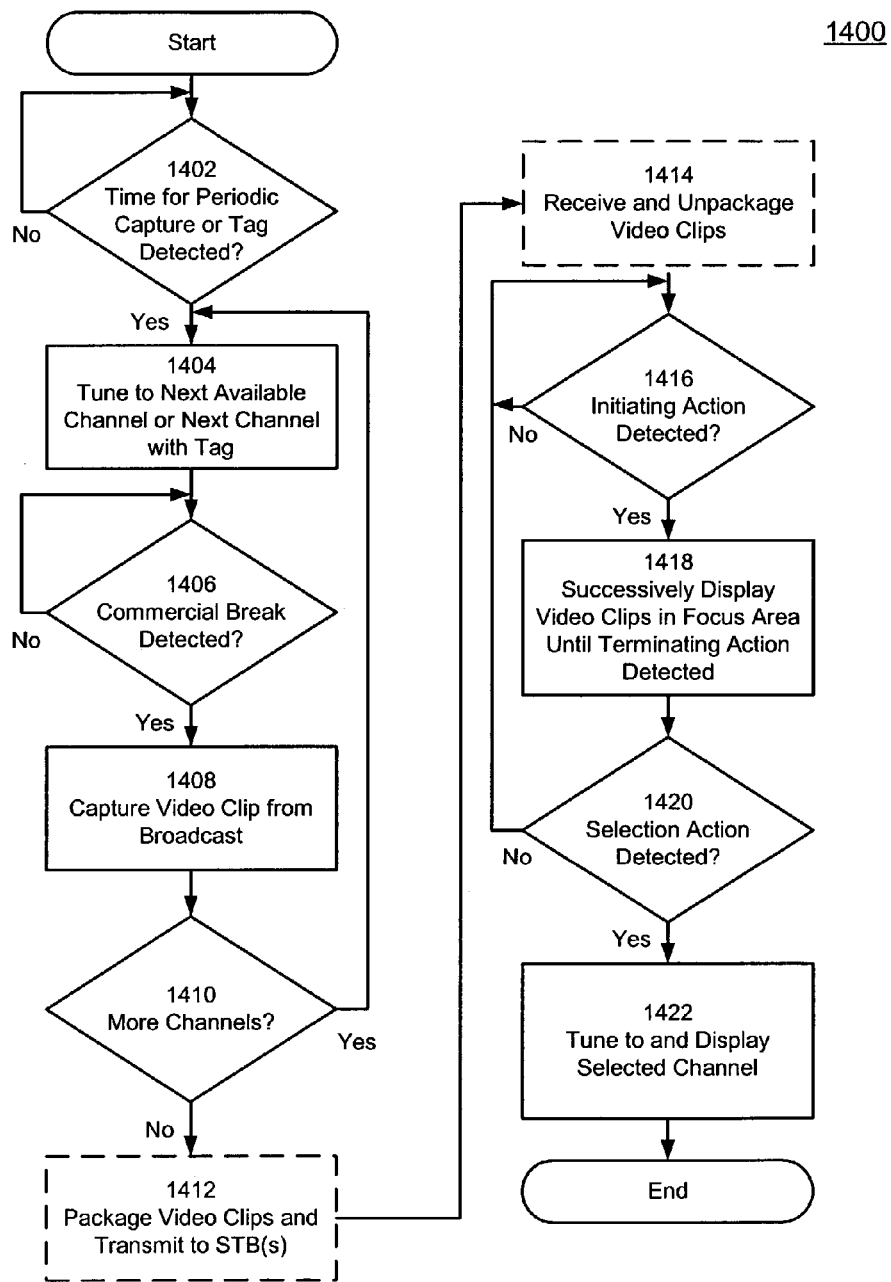
FIG. 14 is a flowchart of a method for capturing video clips from a television broadcast for use in focused navigation.

Referring to FIG. 14, there is shown a flowchart of a method 1400 for capturing video clips 802 for use in focused navigation. A determination 1402 is made whether the time has arrived for periodically capturing the video clips 802 or whether a tag 1002 has been detected for one or more channels.

If so, method 1400 continues by tuning 1404 to the next available channel or the next channel for which a tag 1002 has been detected. Otherwise, the method 1400 waits at step 1402 until either case is satisfied.

After step 1404, a determination 1406 is made whether a commercial break has been detected on the tuned channel. If a commercial break has been detected, the is method 1400 waits at step 1406 until the commercial break is over.

If no commercial break was detected, or after the commercial break is over, the method 1400 continues by capturing 1408 a video clip 802 from the broadcast on the tuned channel. Thereafter, a determination 1410 is made whether there are more available channels or channels with tags 1002 for which a video clip 802 needs to be captured. If more channels remain, the method returns to step 1404 to tune to the next channel.

If, however, video clips 402 have been captured for all available channels or channels with tags, the method 1400 optionally continues by packaging 1412 the video clips 802 into an update package 804 and transmitting the update package 804 to one or more STB(s) 106 (in the case of an embodiment in which video clips 802 are captured at a broadcast center 126). Likewise, the method 1400 may optionally continue by receiving 1416 and unpackaging the video clips 802 from the update package 804 at an STB 106.

Within the STB 106, a determination 1416 is made whether an initiating action by a user (e.g., pressing a designated button on the remote control 108) has been detected. If so, the method 1400 continues by successively displaying 1418 the video clips 802 within a focus area 302 of a GUI 110 until a terminating action (e.g., pressing a same or different button or releasing the first button) has been detected, after which the successive display of video clips 802 is halted to show a particular video clip 802 corresponding to a selected channel.

Thereafter, a determination 1420 is made whether a selection action has been detected (e.g., pressing a selection button on the remote control 108). If no selection action has been detected, the method 1400 returns to step 1416 to await another initiating action. Otherwise, the method 1400 concludes by tuning to 1422 and displaying the selected channel, i.e. the channel corresponding to the video clip 802 remaining in the focus area 802 after the terminating action.

While specific embodiments and applications of the present invention have been illustrated and described, it is to be understood that the invention is not limited to the precise configuration and components disclosed herein. Various modifications, changes, and variations apparent to those skilled in the art may be made in the arrangement, operation, and details of the methods and systems of the present invention disclosed herein without departing from the spirit and scope of the invention.

What is claimed is:

1. A method for enabling access to a plurality of channels within a user interface, the method comprising:
   using a processor to perform the steps of:
   accessing a plurality of video clips, each video clip comprising motion video representing a different respective channel;
   organizing the plurality of video clips into a sequence comprising a first video clip and a second video clip;
   simultaneously displaying two or more of the plurality of video clips along an axis of the user interface, wherein the two or more video clips are actively displaying motion video; and
   scrolling the sequence of video clips along the axis through a non-moving focus area of the user interface in response to a user command, wherein
   responsive to the user command, a first video clip displayed in the focus area is scrolled out of the focus area into a different position in the user interface along the axis and a second video clip is scrolled into the focus area, wherein if the video clip is displayed in the focus area for a predetermined amount of time, the respective live television channel is automatically tuned and displayed.

2. The method of claim 1, further comprising:
   capturing a plurality of video clips, each video clip comprising motion video representing a different respective channel.

3. The method of claim 2, further comprising repeating the capturing of video clips for the plurality of channels after an established time interval, wherein the interval is one of an hour and a half-hour.

4. The method of claim 2, wherein capturing comprises capturing at least one video clip for a particular channel in response to a tag being embedded within the broadcast on that channel.

5. The method of claim 2, wherein capturing comprises asynchronously capturing at least two video clips from different channels in response to tags being embedded within the respective broadcasts at different times.

6. The method of claim 2, wherein capturing comprises:
   receiving a schedule for capturing a video clip for a particular channel; and
   capturing the video clip for the channel at a time specified in the schedule.

7. The method of claim 2, wherein the video clips are captured within a broadcast center, and wherein capturing comprises:
   packaging the video clips within an update package; and
   transmitting the update package to at least one entertainment system associated with the broadcast center.

8. The method of claim 2, wherein capturing comprises successively tuning to each of the plurality of channels using a plurality of tuners.

9. The method of claim 2, wherein the video clips are captured within an entertainment system.

10. The method of claim 9, wherein the entertainment system comprises a primary tuner and a secondary tuner, and wherein capturing comprises successively tuning to each of the plurality of channels using the secondary tuner.

11. The method of claim 1, further comprising:
    tuning to and displayed a channel corresponding to a video clip displayed in the focus area in response to a selection action by the user.

12. A method for enabling access to a plurality of channels within a user interface, the method comprising:
    receiving an update package at an entertainment system associated with a broadcast center from the broadcast center, wherein the update package comprises a plurality of video clips, each video clip representing a different channel;
    organizing the video clips into a sequence;
    simultaneously displaying two or more of the video clips in the sequence along an axis of a user interface, wherein one of the two or more video clips is displayed within a focus area of the user interface, and wherein the two or more video clips are actively displaying motion video; and
    scrolling the video clips along the axis, wherein responsive to scrolling, a video clip displayed in the focus area is scrolled out of the focus area along the axis of the user interface into a different position within the user interface and a second video clip displayed within the user interface is scrolled into the focus area, wherein if the video clip is displayed in the focus area for a predetermined amount of time, the respective live television channel is automatically tuned and displayed.

13. The method of claim 12, wherein the video clips are captured at the broadcast center on each of the plurality of channels, the method further comprising:
    repeating the capturing of video clips for the plurality of channels after an established time interval.

14. The method of claim 12, further comprising:
    delaying the capture of a video clip for a particular channel until after a commercial break being broadcast on that channel.

15. A system for enabling access to a plurality of channels within a user interface, the system comprising:
    a set top box comprising:
    a computer-readable storage medium comprising a plurality of video clips organized into a sequence, wherein each video clip in the sequence comprises motion video representing a different respective channel;
    a display interface; and
    a transmission component to provide the captured video clips to the display interface,
    wherein the display interface is to simultaneously display two or more of the plurality of video clips along an axis of the user interface,
    wherein the two or more video clips are actively displaying motion Video, and to scroll the plurality of video clips along the axis through a non-moving focus area of the user interface in response to a user command, wherein if the video clip is displayed in the focus area for a predetermined amount of time, the respective live television channel is automatically tuned and displayed wherein responsive to the user command, a first video clip displayed in the focus area is scrolled out of the focus area along the axis of the user interface and into a different position within the user interface and a second video clip is scrolled into the focus area.

16. The system of claim 15, further comprising a video capture device configured to capture locally at the set top box a video clip from a broadcast on each of a plurality of channels, each captured video clip comprising motion video representing a different respective channel and to store the captured video clips on the computer-readable storage medium, wherein the video capture device is to repeat the capture of video clips for the plurality of channels after an established time interval.

17. The system of claim 16, wherein the interval comprises a half hour.

18. The system of claim 16, wherein the interval comprises an hour.

19. The system of claim 16, wherein the video capture device is to delay the capture of a video clip for a particular channel until after a commercial break being broadcast on that channel.

20. The system of claim 16, wherein the video capture device is to capture at least one video clip for a particular channel in response to a tag being embedded within the broadcast on that channel.

21. The system of claim 16, wherein the video capture device is to asynchronously capture at least two video clips from different channels in response to tags being embedded within the respective broadcasts at different times.

22. The system of claim 16, wherein the video capture device is to receive a schedule for capturing a video clip for a particular channel and wherein the video capture device is to capture the video clip for the channel at a time specified in the schedule.

23. The system of claim 16, further comprising:
a plurality of tuners to successively tune to each of the plurality of channels during the capture of the video clips.

24. The system of claim 15, wherein the user command comprises activating a first control on a remote control.

25. The system of claim 15, further comprising a tuner for tuning to a selected channel in response to a selection action by the user.

26. A system for enabling access to a plurality of channels within a user interface, the system comprising:
a computer-readable storage medium comprising a sequence of video clips, the sequence comprising a plurality of video clips, each video clip comprising motion video representing a different respective channel;
a display interface; and
a transmission component to provide the sequence of video clips to the display interface,
wherein the display interface is to simultaneously display three or more of the video clips along an axis of the user interface, wherein the three or more video clips are actively displaying motion video, and wherein one of the three or more video clips is displayed within a fixed focus area of the user interface, scroll the video clips along the axis in response to an action by the user, and
wherein responsive to scrolling, a first video clip displayed in the focus area is scrolled out of the focus area along the axis of the user interface, a second video clip displayed at a first location within the user interface is scrolled along the axis of the user interface into the focus area, and a third video clip displayed in the user interface at a second location is scrolled along the axis into the first location, and a fourth video clip that was not displayed in the user interface before the scrolling is scrolled along the axis of the user interface into the second location, wherein if the video clip is displayed in the focus area for a predetermined amount of time, the respective live television channel is automatically tuned and displayed.

27. The system of claim 26, further comprising a video capture device to capture a video clip from a broadcast on each of a plurality of channels and to store the captured video clips in the computer-readable storage medium, wherein the captured video clips represent different respective channels, and wherein the video capture device is to repeat the capturing of a video clip for each of the plurality of channels at established time intervals.

28. The system of claim 27, wherein the video capture device and transmission component are components of a broadcast center, and wherein the transmission component comprises a packaging component to package the video clips within an update package and to transmit the update package to at least one entertainment system associated with the broadcast center.

29. A system for enabling access to a plurality of channels within a user interface, the system comprising:
a commercial break detection device to detect commercial breaks in at least one program being broadcast on a respective channel, wherein the commercial break detection device is configured to detect commercial breaks without intervention by a user of the system at a set top box of the system;
a processor to initiate the capturing of a video clip from a broadcast on each of a plurality of channels, each captured video clip comprising motion video obtained from a different respective channel, wherein the processor is configured to initiate the capturing of each of the captured video clips so as to avoid capturing video from a commercial break;
a tuner to tune to each channel in response to a signal from the processor;
a video capture device to capture each video clip in response to the tuner tuning to the respective channel;
a memory to store the captured video clips;
a display interface to display the plurality of video clips along an axis of the user interface, the user interface comprising a non-moving focus area along the axis, wherein the display interface is to simultaneously display two or more of the plurality of video clips along the axis of the user interface, wherein the two or more video clips are actively displaying motion video, and in response to a user command, to scroll the plurality of video clips along the axis and through the non-moving focus area,
wherein responsive to the user command, a first video clip displayed in the focus area is scrolled out of the focus area along the axis of the user interface and into a different position within the user interface and a second video clip is scrolled into the focus area, wherein if the video clip is displayed in the focus area for a predetermined amount of time, the respective live television channel is automatically tuned and displayed.

30. The system of claim 29, wherein the processor is to periodically initiate the capture of video clips at an established time interval.

31. The system of claim 29, wherein the processor is to capture at least one video clip for a particular channel in response to a tag being embedded within the broadcast on that channel.

32. An apparatus within a broadcast center coupled to a plurality of entertainment systems via a network, the apparatus comprising:
a scheduler to initiate the capturing of a video clip comprising motion video from a broadcast on each of a plurality of channels, each captured video clip representing a different channel,
a video capturer to capture each video clip in response to a signal from the scheduler;
a clip cache within the broadcast center to store the captured video clips;
a packager to package the video clips in the clip cache into an update package;

a transmission component to transmit the update package from the broadcast center to the entertainment systems, wherein each entertainment system comprises a display interface, wherein the display interface is to simultaneously display two or more of the video clips along an axis of a user interface, the user interface comprising non-movable focus area through which the video clips are scrolled, and wherein, in response to a user command to scroll the video clips through the focus area, a first video clip displayed in the focus area is scrolled out of the focus area and into a different position within the user interface and a second video clip displayed in the user interface is scrolled into the focus area, wherein if the video clip is displayed in the focus area for a predetermined amount of time, the respective live television channel is automatically tuned and displayed.

33. The apparatus of claim 32, wherein the scheduler is to periodically initiate the capture of video clips at an established time interval.

34. The apparatus of claim 32, wherein the scheduler is to cause the video capturer to capture at least one video clip for a particular channel in response to a tag being embedded within the broadcast on that channel.

35. A system for enabling access to a plurality of channels within a user interface, the system comprising:
   a processor;
   means operable on the processor for organizing a plurality of video clips into a sequence, each video clip comprising motion video representing a different channel;
   means operable on the processor for concurrently displaying two or more of the plurality of video clips along an axis of the user interface, wherein the two or more video clips are actively displaying motion video; and
   means operable on the processor for scrolling the plurality of video clips along the axis through a non-moving focus area of the user interface in response to a user command,
      wherein responsive to the user command, a first video clip displayed in the focus area is scrolled out of the focus area along the axis of the user interface and into a different position within the user interface and a second video clip is scrolled into the focus area, wherein if the video clip is displayed in the focus area for a predetermined amount of time, the respective live television channel is automatically tuned and displayed.

36. A system for enabling access to a plurality of channels within a user interface, the system comprising: a processor;
   means operable on the processor for detecting commercial breaks in at least one program being broadcast on a respective channel, wherein the means for detecting is configured to detect commercial breaks without intervention by a user of the system at a set top box of the system;
   means operable on the processor for capturing a video clip from a broadcast on each of a plurality of channels, each captured video clip representing a different channel, wherein each captured video clip lacks motion video from a commercial break;
   means operable on the processor for organizing the captured video clips into a sequence;
   means operable on the processor for displaying two or more of the video clips in the sequence along an axis of the user interface, one video clip being displayed within a focus area of the user interface, wherein the two or more video clips are actively displaying motion video;
   means operable on the processor for scrolling the video clips along the axis to progressively change the video clip within the focus area to a next video clip in the sequence in response to an initiating action by a user;
   means operable on the processor for discontinuing the scrolling of video clips to show a particular video clip within the focus area corresponding to a selected channel in response to a terminating action by the user,
   wherein, responsive to the scrolling, the video clip displayed in the focus area is scrolled out of the focus area, a second video clip is scrolled into the focus area, and a third video clip that was not displayed within the user interface before the scrolling is scrolled into the user interface along the axis, and wherein after the terminating action, the second video clip and the third video clip are actively displaying motion video within the user interface, wherein if the video clip is displayed in the focus area for a predetermined amount of time, the respective live television channel is automatically tuned and displayed.

37. A computer-readable medium comprising program code for performing a method for enabling access to a plurality of channels within a user interface, the method comprising:
   organizing a plurality of video clips into a sequence, each video clip representing a different channel;
   simultaneously displaying two or more of video clips along an axis of the user interface, wherein each of the two or more video clips are actively displaying motion video; and
   scrolling the sequence of video clips along the axis through a non-moving focus area of the user interface in response to a user command,
      wherein responsive to the user command, a first video clip displayed in the focus area is scrolled out of the focus area into another location within the user interface, and a second video clip displayed in the user interface is scrolled into the focus area, wherein if the video clip is displayed in the focus area for a predetermined amount of time, the respective live television channel is automatically tuned and displayed.

38. A computer-readable medium comprising program code for performing a method for enabling access to a plurality of channels within a user interface, the method comprising:
   capturing a video clip from a broadcast on each of a plurality of channels, each captured video clip representing a different channel, wherein each captured video clip lacks motion video from a commercial break;
   organizing the captured video clips into a sequence;
   simultaneously displaying two or more of the video clips along an axis of the user interface, a first one of the two or more video clips being displayed within a focus area of the user interface and a second one of the two or more video clips being displayed at another location within the user interface, wherein each of the two or more video clips are actively displaying motion video; and
   scrolling the sequence of video clips along the axis to progressively change the video clip within the focus area to a next video clip in the sequence in response to an action by a user,
   wherein responsive to scrolling, the first video clip is scrolled out of the focus area and into another location within the user interface and the second video clip is scrolled into the focus area, wherein if the video clip is displayed in the focus area for a predetermined amount of time, the respective live television channel is automatically tuned and displayed.

* * * * *